US012755959B2

(12) United States Patent
Lee et al.

(10) Patent No.: US 12,755,959 B2
(45) Date of Patent: Oct. 6, 2026

(54) ELECTRODE ASSEMBLY WITH IMPROVED ELECTROLYTE IMPREGNATION PROPERTY, AND BATTERY, BATTERY PACK AND VEHICLE INCLUDING THE SAME

(71) Applicant: LG ENERGY SOLUTION, LTD., Seoul (KR)

(72) Inventors: Yun-Ju Lee, Daejeon (KR); Duk-Hyun Ryu, Daejeon (KR); Kwan-Hee Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 516 days.

(21) Appl. No.: 18/281,492

(22) PCT Filed: Mar. 11, 2022

(86) PCT No.: PCT/KR2022/003489
§ 371 (c)(1),
(2) Date: Sep. 11, 2023

(87) PCT Pub. No.: WO2022/191674
PCT Pub. Date: Sep. 15, 2022

(65) Prior Publication Data

US 2024/0154090 A1 May 9, 2024

(30) Foreign Application Priority Data

Mar. 12, 2021 (KR) ........................ 10-2021-0032990
Jun. 22, 2021 (KR) ........................ 10-2021-0081138

(51) Int. Cl.
*H01M 4/134* (2010.01)
*H01M 10/04* (2006.01)
(Continued)

(52) U.S. Cl.
CPC ....... *H01M 4/134* (2013.01); *H01M 10/0431* (2013.01); *H01M 50/538* (2021.01); *H01M 10/0525* (2013.01); *H01M 2220/20* (2013.01)

(58) Field of Classification Search
CPC ............... H01M 4/134; H01M 50/538; H01M 10/0431; H01M 10/0525; H01M 2220/20
See application file for complete search history.

(56) References Cited

U.S. PATENT DOCUMENTS 9,099,691 B2 * 8/2015 Hwang ............... H01M 50/548
11,631,546 B2 * 4/2023 Will ......................... H01G 9/06
361/516
(Continued)

FOREIGN PATENT DOCUMENTS

CN 207731998 U 8/2018
CN 108933278 A 12/2018
(Continued)

OTHER PUBLICATIONS

Machine Translation of JP-2001028274-A (Mar. 13, 2026) (Year: 2026).*
(Continued)

*Primary Examiner* — Matthew J Merkling
(74) *Attorney, Agent, or Firm* — Birch, Stewart, Kolasch & Birch, LLP

(57) ABSTRACT

An electrode assembly includes a first electrode, a second electrode, and a separator interposed therebetween. The first electrode, the second electrode and separator are wound in a winding direction about a winding axis to define a core and an outer circumference of the electrode assembly. The first electrode includes an active material portion coated with an active material layer and a first non-coated portion not coated with the active material layer along the winding direction. The first non-coated portion includes a plurality of impregnation slits extending along a circumferential direc-
(Continued)

tion of the electrode assembly. Longitudinal extension lines of impregnation slits adjacent to each other along the circumferential direction do not overlap each other.

37 Claims, 14 Drawing Sheets

(51) Int. Cl.
*H01M 10/0525* (2010.01)
*H01M 50/538* (2021.01)

(56) References Cited

U.S. PATENT DOCUMENTS

| | | | | |
|---|---|---|---|---|
| 12,074,270 | B2 * | 8/2024 | Park | H01M 10/0422 |
| 12,537,231 | B2 * | 1/2026 | Lee | H01M 10/0587 |
| 2005/0233209 | A1 * | 10/2005 | Sudano | H01M 50/533 174/126.1 |
| 2015/0243453 | A1 * | 8/2015 | Taguchi | H01G 11/82 29/25.03 |
| 2018/0342754 | A1 | 11/2018 | Sakamoto et al. | |
| 2019/0348719 | A1 | 11/2019 | Batson et al. | |
| 2022/0200059 | A1 | 6/2022 | Jeong et al. | |
| 2023/0041411 | A1 * | 2/2023 | Seo | H01M 4/70 |
| 2023/0118382 | A1 * | 4/2023 | Lee | H01M 10/0587 429/163 |
| 2023/0170533 | A1 * | 6/2023 | Chung | H01M 4/70 429/163 |
| 2024/0154090 | A1 * | 5/2024 | Lee | H01M 4/134 |

FOREIGN PATENT DOCUMENTS

| | | | | |
|---|---|---|---|---|
| CN | 217544657 | U | 10/2022 | |
| EP | 2608230 | B1 * | 8/2020 | H01G 9/048 |
| JP | 11-283606 | A | 10/1999 | |
| JP | 2000-208129 | A | 7/2000 | |
| JP | 2001028274 | A * | 1/2001 | |
| JP | 2001102030 | A * | 4/2001 | |
| JP | 3819570 | B2 * | 9/2006 | H01M 10/286 |
| JP | 2008-218234 | A | 9/2008 | |
| JP | 4401634 | B2 | 1/2010 | |
| JP | 2011159518 | A * | 8/2011 | |
| JP | 2013-65517 | A | 4/2013 | |
| KR | 10-0964490 | B1 | 6/2010 | |
| KR | 10-2016-0024148 | A | 3/2016 | |
| WO | WO 2009/048300 | A2 | 4/2009 | |
| WO | WO 2020/235904 | A1 | 11/2020 | |

OTHER PUBLICATIONS

Machine Translation of JP-2001102030-A (Mar. 13, 2026) (Year: 2026).*
Machine Translation of JP-2011159518-A (Mar. 13, 2026 (Year: 2026).*
Machine Translation of JP-3819570-B2 (Mar. 13, 2026) (Year: 2026).*
Machine translation of JP 2008218234 A (Mar. 13, 2026) (Year: 2026).*
International Search Report (PCT/ISA/210) issued in PCT/KR2022/003489, dated Jun. 20, 2022.

* cited by examiner

ELECTRODE ASSEMBLY WITH IMPROVED ELECTROLYTE IMPREGNATION PROPERTY, AND BATTERY, BATTERY PACK AND VEHICLE INCLUDING THE SAME

TECHNICAL FIELD

The present disclosure relates to an electrode assembly with an improved electrolyte impregnation property, and a battery, a battery pack and a vehicle including the same.

The present application claims priority to Korean Patent Application No. 10-2021-0032990 filed on Mar. 12, 2021 in the Republic of Korea and Korean Patent Application No. 10-2021-0081138 filed on Jun. 22, 2021 in the Republic of Korea, the disclosures of which are incorporated herein by reference.

BACKGROUND ART

Secondary batteries that have ease of application according to product groups and have electrical characteristics such as high energy density are universally applied not only to portable devices, but also to electric vehicles (EVs) or hybrid electric vehicles (HEVs) driven by an electric drive source. These secondary batteries are attracting attention as a new energy source for improving eco-friendliness and energy efficiency because they not only have the primary advantage of dramatically reducing the use of fossil fuels, but also do not generate any by-products from the use of energy.

Types of secondary batteries currently widely used include lithium-ion batteries, lithium polymer batteries, nickel cadmium batteries, nickel hydrogen batteries, nickel zinc batteries, and the like. Such a unit secondary battery, that is, a unit battery, has an operating voltage of about 2.5 V to 4.5 V. Therefore, when a higher output voltage is required, a battery pack may be configured by connecting a plurality of batteries in series. In addition, a plurality of batteries may be connected in parallel to form a battery pack according to the charge/discharge capacity required for the battery pack. Accordingly, the number of batteries included in the battery pack may be variously set according to a required output voltage and/or charge/discharge capacity.

On the other hand, in general, in a secondary battery, electrolyte may be impregnated in an electrode assembly, so that lithium ions can smoothly move to generate an electric current. At this time, the electrolyte impregnation property is a very important factor affecting the lifespan and capacity of the battery, and it is more advantageous as the electrolyte impregnation rate is higher.

Meanwhile, as the demand for cylindrical secondary batteries for electric vehicles has recently increased, the importance of developing batteries of middle and large sizes, rather than the existing size, has increased in order to improve energy density. However, as the size of the battery increases, the electrolyte impregnation property may be deteriorated in the central part of the electrode of the electrode assembly, and thus the performance of the battery may be deteriorated. That is, the structure of the conventional electrode assembly has limitations in improving the electrolyte impregnation properties of batteries of middle and large sizes.

Therefore, it is required to find a way to improve the electrolyte impregnation property of the electrode assembly of the battery.

Meanwhile, as batteries are applied to electric vehicles, the form factor of batteries increases. That is, compared to the existing 1865, 2170 form factor batteries, the diameter and height of batteries is increasing. The increased form factor leads to increased energy density, enhanced safety against thermal runaway and improved cooling efficiency.

The energy density of batteries may be further increased by minimizing the unnecessary space inside the battery housing with the increasing form factor. Accordingly, it is necessary to design the overall structure of the battery to increase the capacity of the battery and increase the electrolyte impregnation property of the electrode assembly.

DISCLOSURE

Technical Problem

The present disclosure is designed to solve the problems of the related art, and therefore the present disclosure is directed to improving an electrolyte impregnation property of a battery by forming an impregnation slit through which electrolyte can pass on a non-coated portion of the battery so that the electrolyte is uniformly impregnated in an entire electrode assembly type electrode assembly accommodated inside the battery.

In addition, the present disclosure is directed to reducing the internal resistance of the battery by bending one end of the electrode tab to secure a wide contact area between the non-coated portion and a current collector of the electrode assembly.

Furthermore, the present disclosure is directed to improving the coupling strength between the electrode assembly and the current collector by securing a wide contact area between the non-coated portion and the current collector of the electrode assembly.

However, the technical object to be solved by the present disclosure is not limited to the above, and other objects not mentioned herein will be clearly understood by those skilled in the art from the following disclosure.

Technical Solution

In one aspect of the present disclosure, there is provided an electrode having a first electrode, a second electrode, and a separator interposed between the first electrode and the second electrode, the first electrode, the second electrode, and the separator being wound in a winding direction about a winding axis to define a core and an outer circumference of the electrode assembly, wherein the first electrode includes an active material portion coated with an active material layer and a first non-coated portion not coated with the active material layer along a winding direction, wherein the first non-coated portion includes a plurality of impregnation slits extending along a circumferential direction of the electrode assembly, and wherein longitudinal extension lines of impregnation slits adjacent to each other along the circumferential direction do not overlap each other.

Preferably, each impregnation slit may have a shape extending in a direction parallel to the circumferential direction.

In particular, a length of each impregnation slit in the circumferential direction may be longer than a length of each impregnation slit in a direction of the winding axis.

In an embodiment of the present disclosure, among the plurality of impregnation slits, the impregnation slits adjacent to each other along the circumferential direction may be at different heights in a direction of the winding axis direction without being formed on a same line.

In another embodiment of the present disclosure, among the plurality of impregnation slits, the impregnation slits adjacent to each other along the circumferential direction may be spaced apart from each other by a predetermined distance along a direction parallel to the winding axis of the electrode assembly.

In still another embodiment of the present disclosure, based on any one impregnation slit, longitudinal extension lines of impregnation slits located at the left and the right of the any one impregnation slit may overlap each other.

In still another embodiment of the present disclosure, a distance between the impregnation slits adjacent to each other along the circumferential direction may be constant.

Alternatively, a distance between the impregnation slits adjacent to each other along the circumferential direction may gradually increase from the core toward the outer circumference of the electrode assembly.

In still another embodiment of the present disclosure, a length of each impregnation slit in the circumferential direction may be constant.

Alternatively, lengths of the impregnation slits in the circumferential direction may gradually increase from the core toward the outer circumference of the electrode assembly.

In still another embodiment of the present disclosure, the plurality of impregnation slits may be inclined at a predetermined angle with respect to a line extending along the circumferential direction.

Here, the plurality of impregnation slits may be parallel to each other.

In still another embodiment of the present disclosure, among the plurality of impregnation slits, impregnation slits adjacent to each other along a radial direction of the electrode assembly may at least partially overlap each other to provide an impregnation path to allow electrolyte to pass through along the radial direction.

Preferably, the impregnation path may extend from the outer circumference of the electrode assembly to a predetermined depth along the radial direction.

In still another embodiment of the present disclosure, at least one of the first non-coated portion and the second non-coated portion may have a plurality of fragments spaced apart from each other along the circumferential direction of the electrode assembly and partitioned by a plurality of cutting lines having a predetermined depth from an end of the non-coated portion.

Preferably, the plurality of fragments may be ben to overlap each other in multiple layers along a radial direction of the electrode assembly to define a bent surface.

Here, the bent surface may include a stack number increasing region in which an overlapping layer number of the fragments sequentially increases to a maximum value from the outer circumference toward the core, and a stack number uniform region from a radial point at which the overlapping layer number becomes the maximum value to a radial point at which an innermost fragment exists.

In an embodiment, the plurality of fragments may be bent in the radial direction of the electrode assembly to cover at least a part of one surface of the electrode assembly perpendicular to the winding axis.

In another embodiment, the plurality of fragments may be bent in the radial direction of the electrode assembly to entirely cover one surface of the electrode assembly perpendicular to the winding axis.

In still another embodiment of the present disclosure, among the plurality of impregnation slits, impregnation slits adjacent to each other along the radial direction of the electrode assembly may at least partially overlap each other to provide an impregnation path to allow electrolyte to pass through along the radial direction.

Preferably, the impregnation path may be provided to a predetermined depth along the radial direction from the outer circumference of the electrode assembly.

More preferably, the depth of the impregnation path may be greater than or equal to a radial length of an area covered by the plurality of fragments in one surface of the electrode assembly perpendicular to the winding axis.

In still another embodiment of the present disclosure, the non-coated portion may include a first line that is an imaginary line spaced apart from the active material portion by a first distance and parallel to a boundary line between the active material portion and the non-coated portion; and a second line that is an imaginary line spaced apart from an end of the cutting line by a second distance and parallel to the boundary line between the active material portion and the non-coated portion.

Here, each impregnation slit may be provided on at least one of the first line and the second line.

Preferably, the plurality of impregnation slits may be alternately provided on the first line and the second line along the circumferential direction of the electrode assembly.

In still another embodiment of the present disclosure, impregnation slits located on different lines of the first line and the second line may not overlap each other in a direction of the winding axis.

In still another embodiment of the present disclosure, lengths of the impregnation slits in the circumferential direction located on a same line of the first line and the second line may gradually increase from the core toward the outer circumference of the electrode assembly.

In still another embodiment of the present disclosure, a distance between the impregnation slits located on a same line of the first line and the second line may gradually increase from the core toward the outer circumference of the electrode assembly.

In still another embodiment of the present disclosure, the non-coated portion may further include at least one intermediate line that is an imaginary line located between the first line and the second line, parallel to the first line and the second line, and spaced apart from the first line and the second line by a predetermined length.

Here, the non-coated portion may further include a plurality of intermediate impregnation slits on the intermediate line.

Preferably, the at least one intermediate line may include a plurality of intermediate lines, and the intermediate impregnation slits may be alternately provided on the plurality of intermediate lines along the circumferential direction.

In still another embodiment of the present disclosure, numbers of impregnation slits provided on the first line, the second line and the at least one intermediate line may be identical to each other.

In still another embodiment of the present disclosure, the cutting line and the plurality of impregnation slits may be spaced apart from each other by a predetermined distance.

Preferably, the predetermined distance between the cutting line and the plurality of impregnation slits may be 1 mm to 5 mm.

In an embodiment of the present disclosure, the first non-coated portion may be located at an upper portion of the electrode assembly.

Preferably, the first electrode may be a negative electrode.

In another embodiment of the present disclosure, the second electrode may include an active material portion coated with an active material layer and a second non-coated portion not coated with the active material layer along the winding direction.

Here, the second non-coated portion may include a plurality of impregnation slits extending along the circumferential direction of the electrode assembly, and longitudinal extension lines of impregnation slits of the second electrode adjacent to each other along the circumferential direction may not overlap each other.

In addition, a battery according to an embodiment of the present disclosure comprises the electrode assembly according to the above embodiments.

Meanwhile, a battery pack according to an embodiment of the present disclosure comprises at least one battery according to an embodiment of the present disclosure.

Meanwhile, a vehicle according to an embodiment of the present disclosure comprises the battery pack according to an embodiment of the present disclosure.

Advantageous Effects

According to the present disclosure, the electrolyte impregnation property of the electrode assembly may be improved.

In particular, according to the present disclosure, it is possible to improve the electrolyte impregnation property of a battery by forming a path through which electrolyte can pass on a non-coated portion of the battery so that the electrolyte is uniformly impregnated in the entire electrode assembly accommodated inside the battery.

In addition, according to the present disclosure, it is possible to reduce the internal resistance of the battery by securing a wide contact area between the non-coated portion and the current collector of the electrode assembly.

Furthermore, according to the present disclosure, it is possible to improve the coupling strength between the electrode assembly and the current collector by securing a wide contact area between the non-coated portion and the current collector of the electrode assembly.

In addition, the present disclosure may have various other effects, which will be described in each embodiment, or a corresponding description will be omitted for effects that can be easily inferred by a person skilled in the art.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
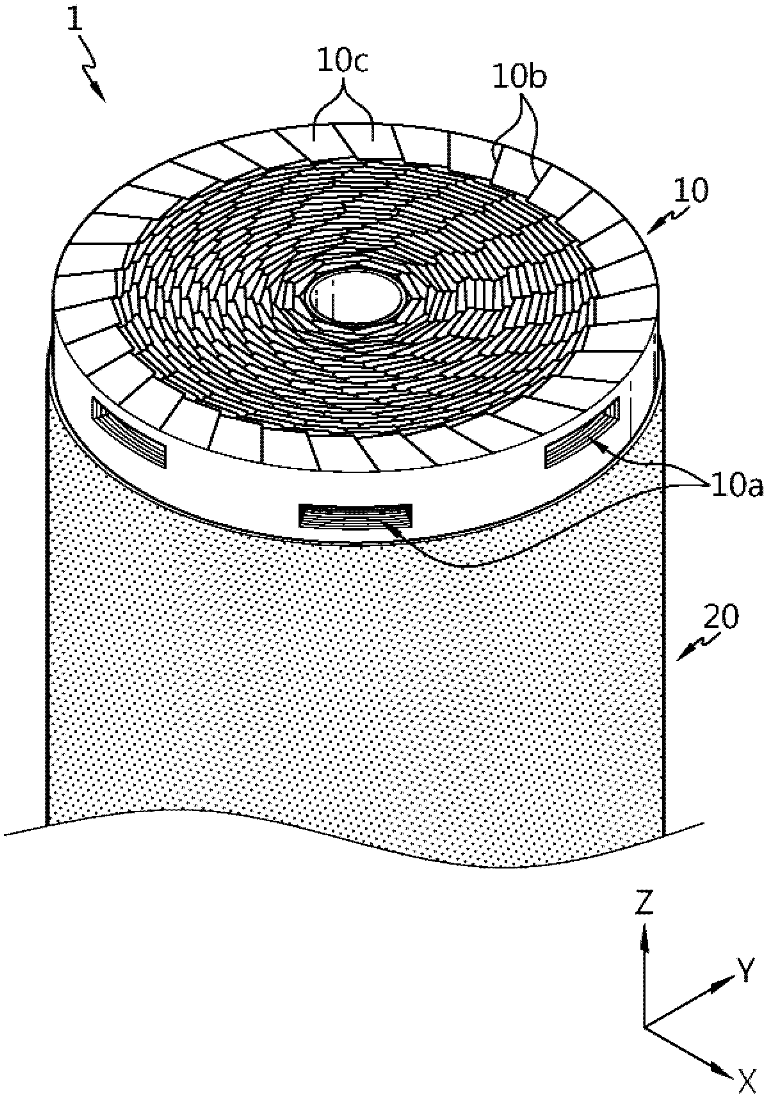
FIG. 1 is a diagram for explaining an electrode assembly according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments disclosed in this specification and the configuration illustrated in the drawings are only one of the most preferred embodiments of the present disclosure and do not represent all the technical idea of the present disclosure, so it should be understood that other equivalents and modifications could be made thereto without departing from the scope of the disclosure.

In addition, to help the understanding of the present disclosure, the accompanying drawings may illustrate some elements in exaggerated dimensions, not in actual scale. Furthermore, the same element in different embodiments may be given the same reference number.

When two components are referred to as being equal, it represents that they are 'substantially equal'. Accordingly, substantially equal may encompass all cases having the deviation regarded as a low level in the corresponding technical field, for example, the deviation of 5% or less. In addition, a uniform parameter in a predetermined area may be uniform from the average point of view.

Although the terms first, second or the like are used to describe different elements, these elements are not limited by the terms. These terms are used to distinguish one element from another, and unless stated to the contrary, a first element may be a second element.

Throughout the specification, unless stated otherwise, each element may be singular or plural.

When an element is "above (or under)" or "on (or below)" another element, the element can be on an upper surface (or a lower surface) of the other element, and intervening elements may be present between the element and the other element on (or below) the element.

Additionally, when an element is referred to as being "connected", "coupled" or "linked" to another element, the element can be directly connected or coupled to the other element, but it should be understood that intervening elements may be present between each element, or each element may be "connected", "coupled" or "linked" to each other through another element.

Throughout the specification, "A and/or B" refers to either A or B or both A and B unless expressly stated otherwise, and "C to D" refers to C or greater and D or smaller unless expressly stated otherwise.

For convenience of description, a direction that goes along a lengthwise direction of a winding axis of an electrode assembly wound in a roll shape is herein referred to as a winding axis direction Z. Additionally, a direction around the winding axis is herein referred to as a circumferential or peripheral direction X. Additionally, a direction that gets closer to or faces away from the winding axis is referred to as a radial direction. Among them, in particular, the direction that gets closer to the winding axis is referred to as a centripetal direction or a core-side direction, and the direction that faces away from the winding axis is referred to as a centrifugal direction or an outer circumferential direction.

Figure 2A:
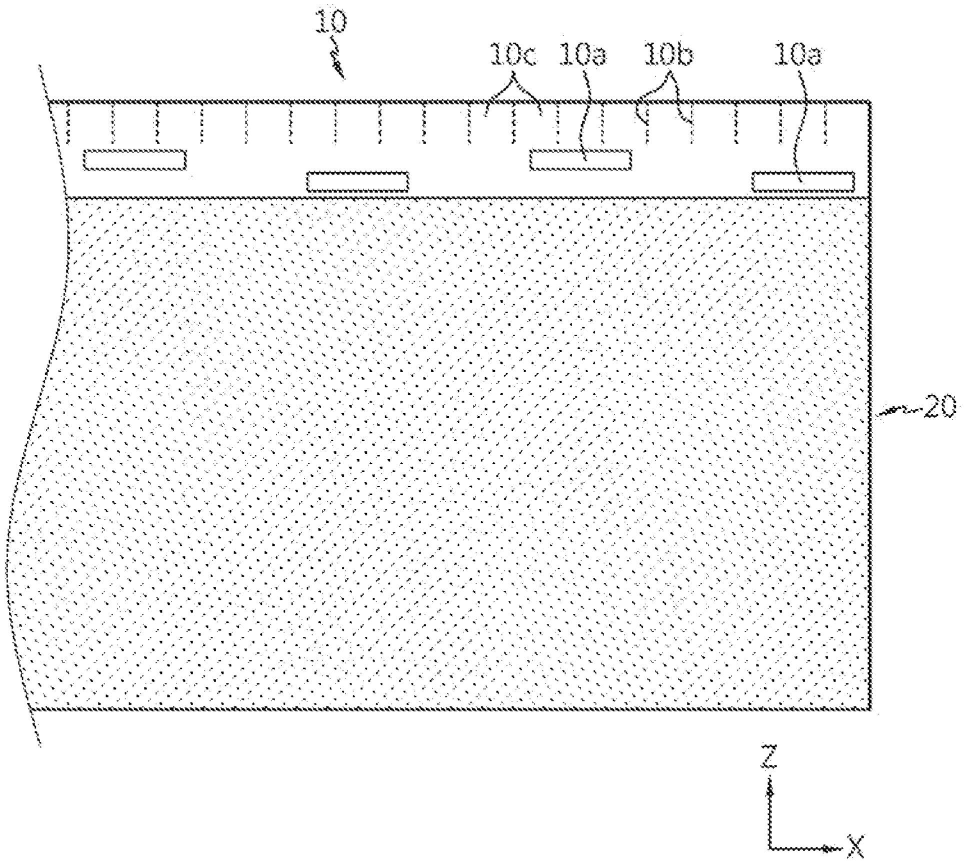
FIG. 2*a* is a diagram for explaining a state in which a first electrode applied to the electrode assembly of FIG. 1 is spread.
Figure 2B:
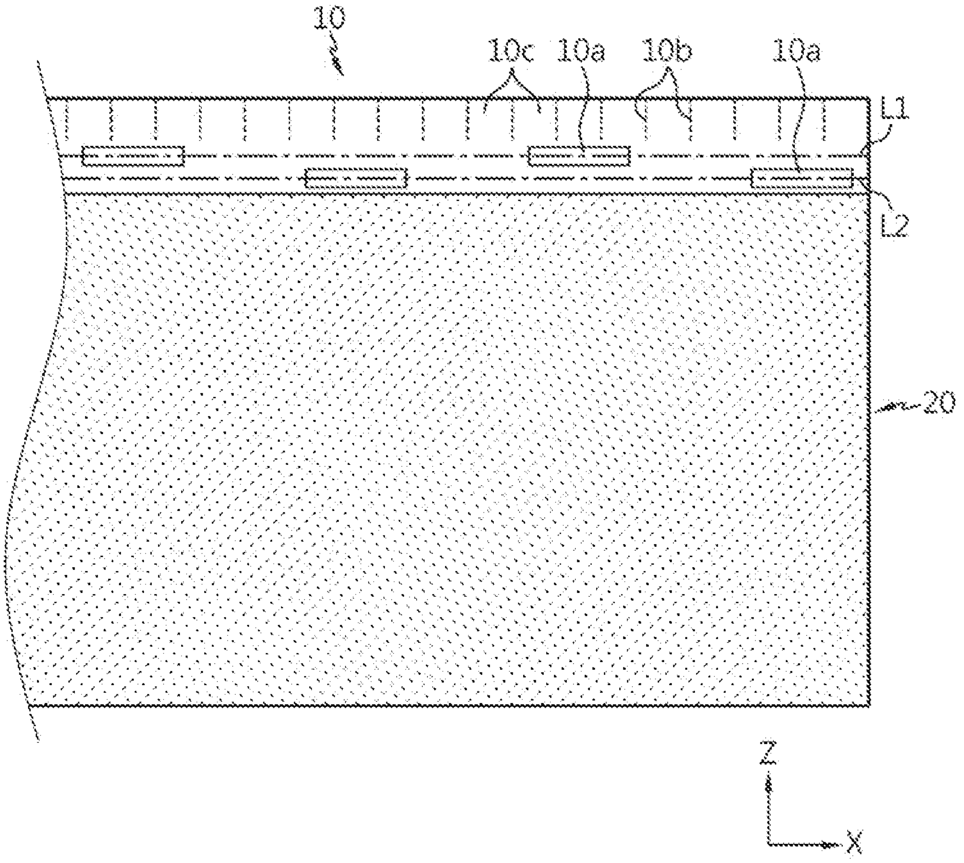
FIG. 2*b* is a diagram for explaining a first line and a second line provided to a non-coated portion.

FIG. 1 is a diagram for explaining an electrode assembly according to an embodiment of the present disclosure, and FIG. 2*a* is a diagram for explaining a state in which a first electrode applied to the electrode assembly of FIG. 1 is spread. In addition, FIGS. 2*b* to 3 are diagrams for explaining first electrodes having different shapes from the first electrode shown in FIG. 2*a*.

Referring to FIGS. 1 and 2*a*, the electrode assembly is an electrode assembly having a shape in which a stack including a first electrode, a second electrode and a separator is wound.

The first electrode includes a first non-coated portion with a first polarity, and the second electrode includes a second non-coated portion with a second polarity. For example, the first electrode may be a positive electrode or a negative electrode, and the second electrode may be an electrode having a polarity opposite to that of the first electrode. The separator is interposed between the first electrode and the second electrode. The stack in which the first electrode, the separator, the second electrode, and the separator are sequentially stacked at least once is wound based on a winding center C extending along a width direction of the first electrode and the second electrode, that is, a height direction of the electrode assembly 1 (parallel to the Z-axis) to form the electrode assembly 1.

The first electrode and/or the second electrode may include a non-coated portion and a coated portion. Here, the coated portion refers to an active material portion coated with an active material layer. In the electrode assembly 1, the first electrode, the second electrode and the separator interposed therebetween may be wound based on the winding axis to define a core and an outer circumferential surface. In this instance, the first electrode may include an active material region that is coated with an active material layer and a first non-coated portion 10 that is not coated with the active material layer along the winding direction, and at least part of the first non-coated portion 10 may be used as the electrode tab in itself. On the other hand, the second electrode may include an active material region that is coated with an active material layer and a second non-coated portion that is not coated with the active material layer along the winding direction, and at least part of the non-coated portion may be used as the electrode tab in itself.

More specifically, the first electrode includes a first conductive substrate and a first electrode active material coated on one surface or both surfaces of the first conductive substrate. At one end of the first conductive substrate in a width direction (parallel to the Z-axis), there is a first non-coated portion 10 on which the first electrode active material is not coated. The first non-coated portion 10 functions as a first electrode tab. The first non-coated portion 10 is provided above the electrode assembly accommodated in a battery housing in a height direction (parallel to the Z-axis). At an opposite side of the non-coated portion of the first conductive substrate, there is a first coated portion 20 coated with the first electrode active material.

Meanwhile, although not shown in the drawings, the second electrode includes a second conductive substrate and a second electrode active material coated on one surface or both surfaces of the second conductive substrate. At the other end of the second conductive substrate in the width direction, there is a second non-coated portion on which the second electrode active material is not coated. The second non-coated portion functions as a second electrode tab. The second non-coated portion is provided under the electrode assembly accommodated in the battery housing in the height direction. At an opposite side of the non-coated portion of the second conductive substrate, there is a second coated portion coated with the second electrode active material.

In the present disclosure, the positive active material coated on the positive electrode plate and the negative electrode active material coated on the negative electrode plate may be used without limitation as long as the active material is known in the art.

In one example, the positive electrode active material may include alkali metal compounds represented by a general formula $A[A_x M_y]O_{2+z}$ (A includes at least one element among Li, Na and K; M includes at least one element selected from Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $0.1 \leq z \leq 2$; the stoichiometric coefficients x, y, z are selected such that the compound remains electrically neutral).

In another example, the positive electrode active material may be an alkali metal compound $xLiM^1O_2$-$(1-x)Li_2M^2O_3$ ($M^1$ comprises at least one element having an average oxidation state 3; $M^2$ comprises at least one element having an average oxidation state 4; $0 \leq x \leq 1$) disclosed in U.S. Pat. Nos. 6,677,082, 6,680,143, et al.

In another example, the positive electrode active material may be lithium metal phosphate represented by a general formula $Li_aM^1_xFe_{1-x}M^2_yP_{1-y}M^3_zO_{4-z}$ ($M^1$ includes at least one element selected from Ti, Si, Mn, Co, Fe, V, Cr, Mo, Ni, Nd, Al, Mg and Al; $M^2$ includes at least one element selected from Ti, Si, Mn, Co, Fe, V, Cr, Mo, Ni, Nd, Al, Mg, Al, As, Sb, Si, Ge, V and S; $M^3$ includes a halogen element optionally including F; $0<a \leq 2$, $0 \leq x \leq 1$, $0 \leq y<1$, $0 \leq z<1$; the stoichiometric coefficients a, x, y, z are selected such that the compound remain electrically neutral), or $Li_3M_2(PO_4)_3$ [M includes at least one element selected from Ti, Si, Mn, Fe, Co, V, Cr, Mo, Ni, Al, Mg and Al].

Preferably, the positive electrode active material may include primary particles and/or secondary particles in which the primary particles are aggregated.

In one example, the negative electrode active material may use a carbon material, lithium metal or lithium metal compound, silicon or silicon compound, tin or tin compound. Metal oxides such as $TiO_2$ and $SnO_2$ with a potential of less than 2 V may also be used as the negative electrode active material. As the carbon material, all of low-crystalline carbon, high-crystalline carbon, and the like may be used.

The separator may use a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, or laminates thereof. As another example, the separator may use a conventional porous nonwoven fabric, for example, a nonwoven fabric made of high melting point glass fiber, polyethylene terephthalate fiber, or the like.

At least one surface of the separator may include a coating layer of inorganic particles. It is also possible that the separator itself is made of a coating layer of inorganic particles. Particles constituting the coating layer may have a structure coupled with a binder so that interstitial volumes exist between adjacent particles.

The inorganic particles may be formed of an inorganic material having a dielectric constant of 5 or more. As a non-limiting example, the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3—PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

The electrolyte may be a salt having a structure such as $A^+B^-$. Here, $A^+$ includes an alkali metal cation such as $Li^+$, $Na^+$, or $K^+$, or an ion composed of a combination thereof. In addition, $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent and then used. The organic solvent may use propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

In the electrode assembly 1 of the present disclosure, the first electrode and the second electrode extend in opposite directions along the height direction (parallel to the Z-axis) of the electrode assembly 1.

In the following description, the structure of the first electrode will be described in detail. However, this is only an exemplary description, and the structure of the first electrode to be described below may be applied to both the first electrode and the second electrode, or may be applied only to the second electrode.

Referring to FIGS. 1 to 3, the first non-coated portion 10 includes a plurality of impregnation slits 10*a*. The first non-coated portion 10 may further include a plurality of cutting lines 10*b* and a fragment 10*c* partitioned by the cutting lines 10*b*.

The plurality of impregnation slits 10*a* may be formed by, for example, mold punching or laser notching. The plurality of impregnation slits 10*a* may be formed along a circumferential direction of the electrode assembly 1, that is, a winding direction of the electrode assembly 1. At this time, longitudinal extension lines of the impregnation slits 10*a* adjacent to each other along the circumferential direction may not overlap each other. That is, the longitudinal extension lines of the plurality of impregnation slits 10*a* may be arranged approximately parallel to each other.

Referring to FIGS. 1, 2*a* and 2*b*, the longitudinal extension lines of the plurality of impregnation slits 10*a* may have a shape extending in a direction approximately parallel to the circumferential direction. For example, a length of the impregnation slit 10*a* in the circumferential direction may be longer than a length of the impregnation slit 10*a* in the winding axis direction.

In an embodiment of the present disclosure, referring to FIG. 2*b*, among the plurality of impregnation slits 10*a*, the impregnation slits 10*a* adjacent to each other along the circumferential direction may be provided at staggered positions instead of being formed on the same line. In other words, among the plurality of impregnation slits 10*a*, the impregnation slits 10*a* adjacent to each other along the circumferential direction may not be formed on the same line but may be provided at different heights in the winding axis direction. That is, among the plurality of impregnation slits 10*a*, the impregnation slits 10*a* adjacent to each other along the circumferential direction may be spaced apart from each other by a predetermined distance in a direction parallel to the winding axis of the electrode assembly 1. Accordingly, the longitudinal extension lines of the impregnation slits 10*a* adjacent to each other along the circumferential direction do not overlap each other.

With the above structure, in the present disclosure, the strength of the first non-coated portion 10 may be secured at a certain level. For example, if the plurality of impregnation slits 10*a* having a shape extending in a direction parallel to the circumferential direction are formed on the same line, the strength of the first non-coated portion 10 at the position where the plurality of impregnation slits 10*a* are formed may become very weak. That is, in the first non-coated portion 10, the area of the cross section at the position where the impregnation slit 10*a* is formed, that is, the area of the cross section cut along a direction perpendicular to the winding axis of the electrode assembly 1 (parallel to the X-Y plane) is reduced. Accordingly, the first non-coated portion 10 may be damaged due to shock or vibration applied during the use of the battery, which may cause poor performance of the battery and/or safety issues such as ignition due to internal short circuit.

On the other hand, according to the present disclosure, the impregnation slits 10*a* adjacent to each other along the circumferential direction are not formed on the same line but are provided at staggered positions. More specifically, as shown in FIG. 1, the impregnation slits 10*a* adjacent to each other along the circumferential direction may be spaced apart from each other by a predetermined distance in a direction parallel to the winding axis of the electrode assembly 1. According to this structure, the reduction of the area of the cross section of the first non-coated portion 10 at the position where the impregnation slit 10*a* is formed, that is, the cross section cut along the direction perpendicular to the winding axis of electrode assembly 1 (parallel to the XY plane) may be minimized. Accordingly, the tensile strength of the first non-coated portion 10 in a winding axis direction (parallel to the Z axis) may be improved. Therefore, in this case, even when an external force is applied to the first non-coated portion 10, the first non-coated portion 10 is not easily broken.

In another embodiment of the present disclosure, longitudinal extension lines of the impregnation slits 10*a* located at the left and right with respect to any one impregnation slit

10*a* may overlap each other. For example, referring to FIG. 2*b*, the longitudinal extension line of the impregnation slit 10*a* located at the left and the longitudinal extension line of the impregnation slit 10*a* located at the right with respect to any one impregnation slit 10*a* may be on the same line. Due to the structure in which the impregnation slits 10*a* are provided on the same line as described above, as the first electrode is wound, the impregnation slits 10*a* may overlap each other. Accordingly, an impregnation path IP may be provided along the radial direction of electrode assembly 1.

In another embodiment of the present disclosure, referring to FIG. 2*b*, the distance between the impregnation slits 10*a* adjacent in the circumferential direction may be constant. Alternatively, as another embodiment, referring to FIG. 2*d*, the distance between the impregnation slits 10*a* adjacent in the circumferential direction may gradually increase from the core of the electrode assembly 1 toward the outer circumference. More specifically, referring to FIG. 2*d*, the sheet-shaped first electrode and/or the sheet-shaped second electrode has a structure of being wound in one direction. In this case, the plurality of impregnation slits 10*a* may be provided along the circumferential direction. The distance between the impregnation slits 10*a* may be relatively small at the core of the first electrode and/or the second electrode, and the distance between the impregnation slits 10*a* may be gradually increase toward the outer circumference. This is because the radius of the electrode assembly 1 increases as the first electrode and/or the second electrode are wound in one direction, and the length of the circumference formed by layers constituting the electrode assembly 1 increases toward the outer circumference. That is, as the first electrode and/or the second electrode are wound in one direction, the size of the circumference of the outermost layer gradually increases. Therefore, when forming the impregnation slits 10*a* on the sheet-shaped first electrode and/or the sheet-shaped second electrode, if the distance between the impregnation slits 10*a* increases toward the outer circumference, the possibility that the impregnation slit 10*a* provided at the previous layer and the impregnation slit 10*a* provided at the next layer face each other is increased, so it is more likely to provide an impregnation path IP along the radial direction of the electrode assembly 1. That is, according to this structure of the present disclosure, the impregnation path IP may be effectively provided. Therefore, the electrolyte impregnation characteristics in the central portion of the electrode of the electrode assembly 1 may be improved.

In an embodiment of the present disclosure, referring to FIG. 2*b*, the length of the impregnation slit 10*a* in the circumferential direction may be constant. Alternatively, referring to FIG. 2*e* as another embodiment, the length of the impregnation slit 10*a* in the circumferential direction may gradually increase from the core of the electrode assembly 1 toward the outer circumference. Accordingly, the width of the impregnation path IP may be gradually increased toward the outer circumference of the electrode assembly 1.

According to such a structure, since the impregnation slit 10*a* provided at the previous layer and the impregnation slit 10*a* provided at the next layer are more likely to face each other, the possibility of providing the impregnation path IP increases. In addition, since the area of the impregnation slit 10*a* provided at the outermost layer, at which electrolyte begins to impregnate into the electrode assembly 1, is large, the electrolyte may be smoothly impregnated into the electrode assembly 1. At the same time, since the area of the impregnation slit 10*a* provided at the core is formed small, it is possible to minimize the reduction of the area of the cross section cut along a direction (direction parallel to the X-Y plane) perpendicular to the winding axis of the electrode assembly 1. Accordingly, the tensile strength of the first non-coated portion 10 in the winding axis direction (parallel to the Z axis) may be improved.

Figure 2C:
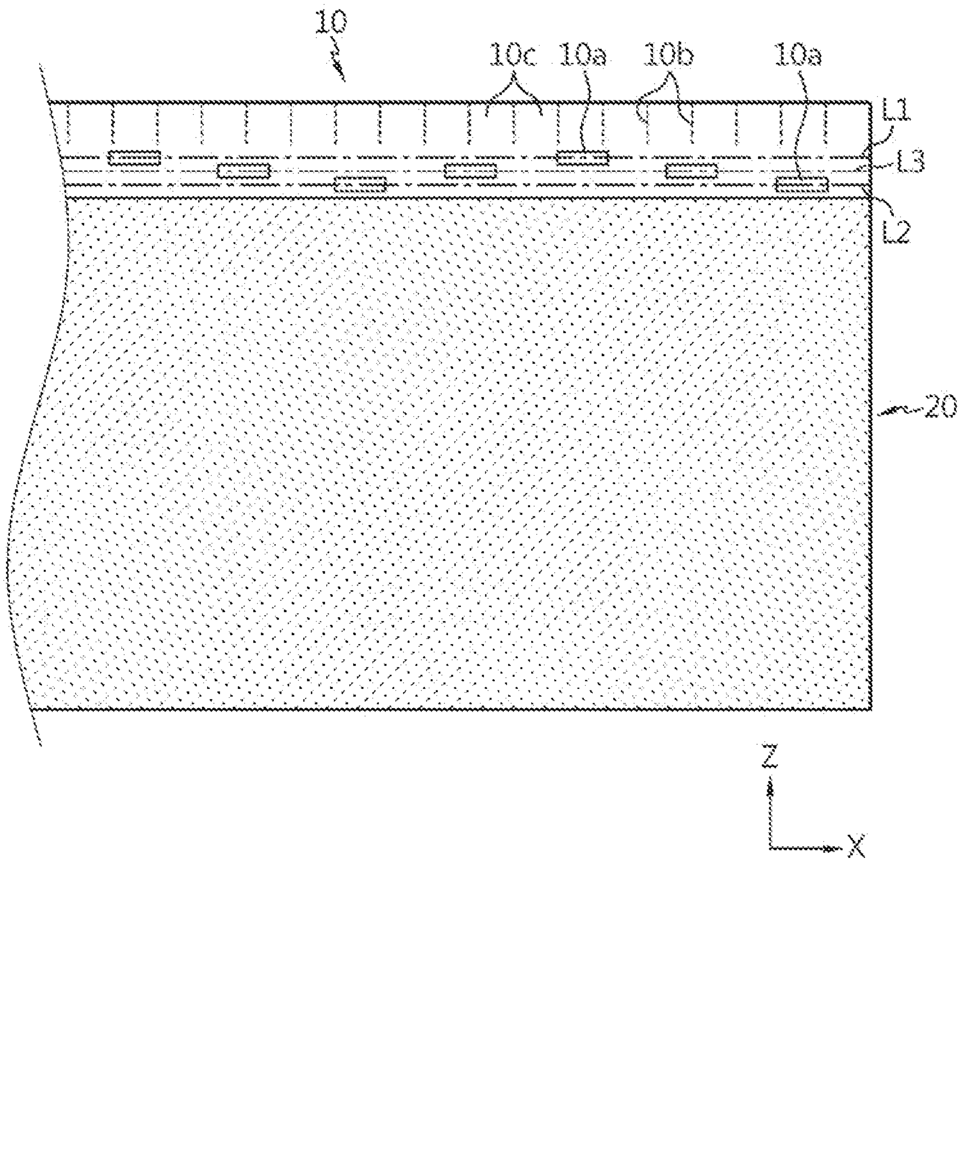
FIG. 2*c* is a diagram for explaining a first line, a second line and a third line provided to the non-coated portion.
Figure 2D:
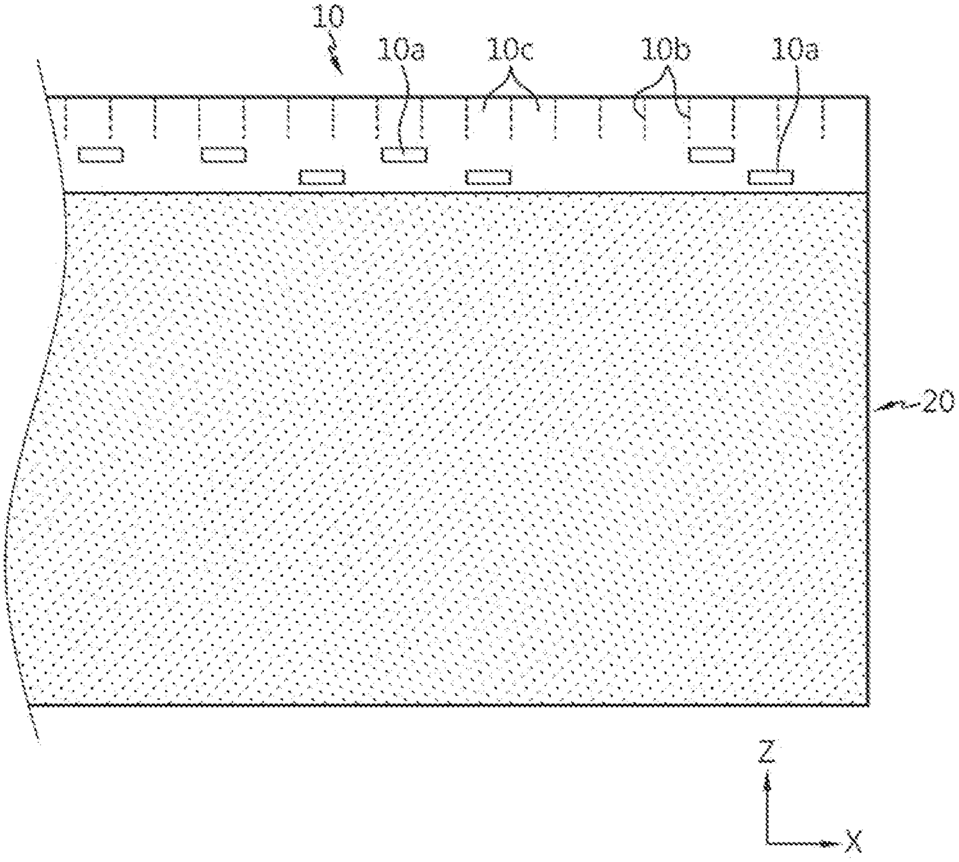
FIG. 2*d* is a diagram for explaining a first electrode having a different shape from the first electrode shown in FIG. 2*a*.
Figure 2E:
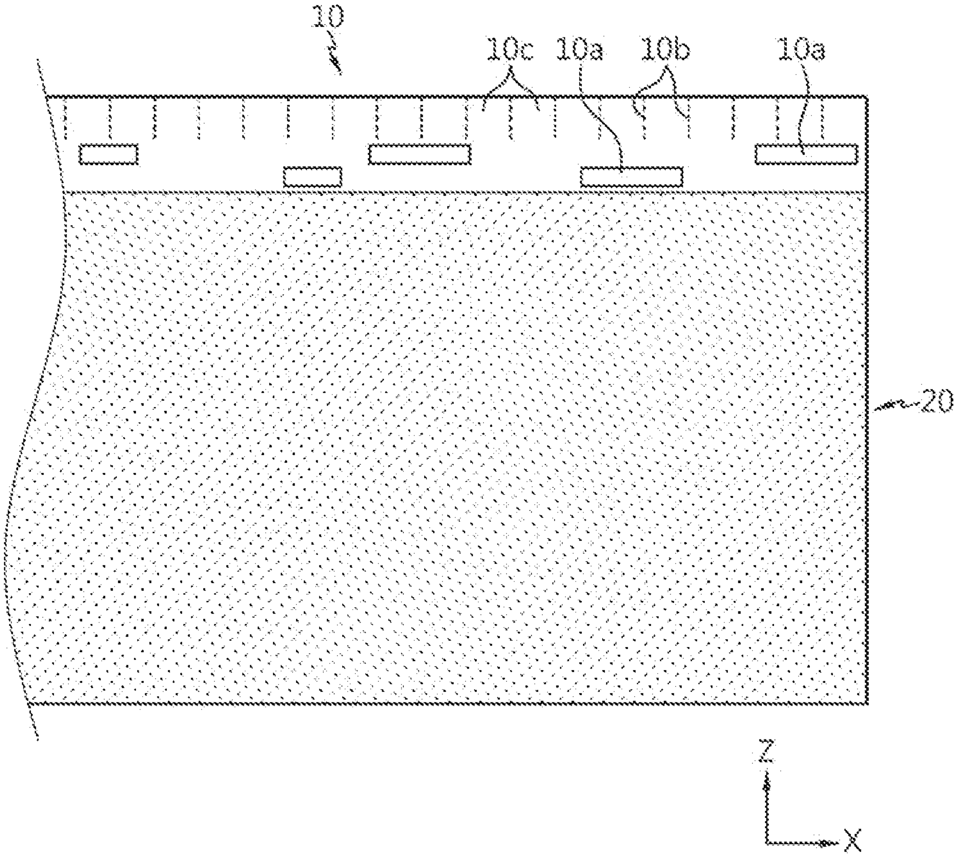
FIG. 2*e* is a diagram for explaining a first electrode having a still different shape from the first electrode shown in FIG. 2*a*.
Figure 3:
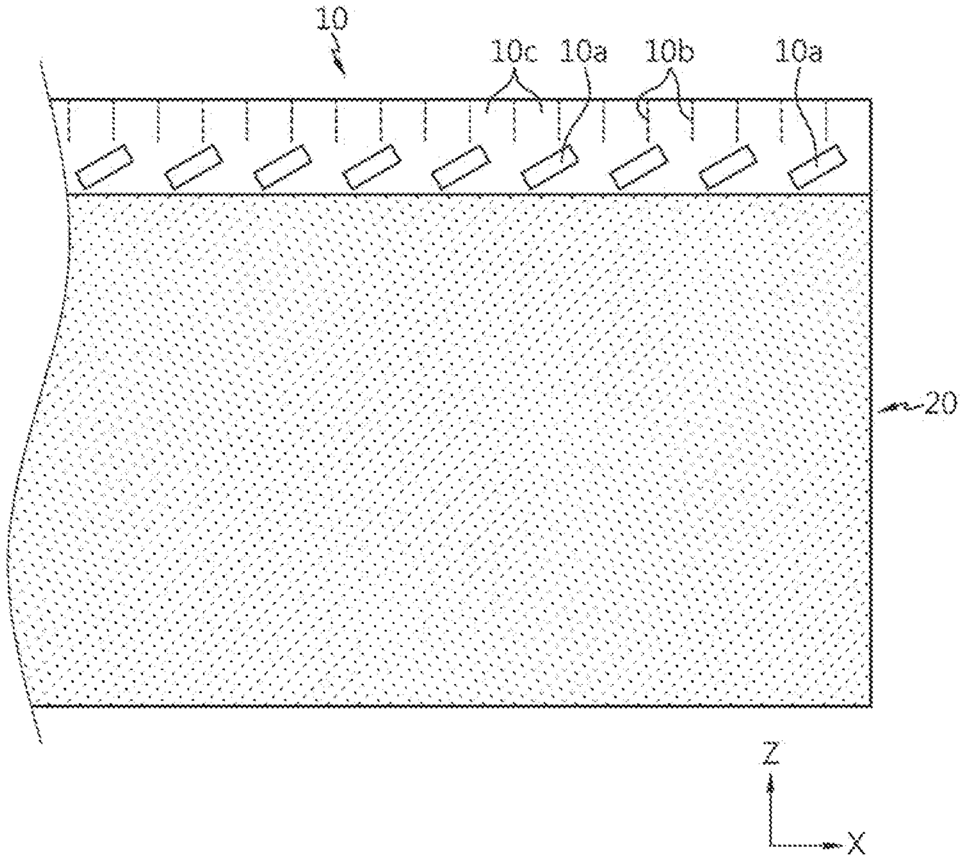
FIG. 3 is a diagram for explaining a first electrode having a still different shape from the first electrode shown in FIG. 2*a*.

FIG. 2*b* is a diagram for explaining a first line and a second line, and FIG. 2*c* is a diagram for explaining a first line, a second line and a third line.

Referring to FIGS. 2*b* and 2*c*, the first non-coated portion 10 may include a first line L1 is an imaginary straight line spaced apart from the active material portion by a first distance and parallel to a boundary line between the active material portion and the first non-coated portion 10; and a second line L2 that is an imaginary straight line spaced apart from the end of the cutting line 10*b* by a second distance and parallel to the boundary line between the active material portion and the first non-coated portion 10. Here, the impregnation slits 10*a* may be provided on at least one of the first line L1 and the second line L2. Preferably, the impregnation slits 10*a* may be alternately provided on the first line and the second line along the circumferential direction of the electrode assembly 1. In particular, impregnation slits 10*a* located on different lines may not overlap each other in the winding axis direction. For example, referring to FIG. 2*b*, the impregnation slit 10*a* located on the first line L1 does not overlap with the impregnation slit 10*a* located on the second line L2 in the winding axis direction. If the impregnation slit 10*a* located on the first line L1 and the impregnation slit 10*a* located on the second line L2 are overlapped in the winding axis direction, the area of the cross-section of the first non-coated portion 10 cut in the winding axis direction is reduced, which leads to a decrease in the strength of the first non-coated portion 10.

In another embodiment of the present disclosure, the length of the impregnation slit 10*a* located on the same line in the circumferential direction may gradually increase from the core of the electrode assembly 1 toward the outer circumference. For example, referring to FIG. 2*e*, the length of the impregnation slit 10*a* located on the first line L1 in the circumferential direction may be configured to gradually increase toward the outer circumference. Similarly, the length of the impregnation slit 10*a* located on the second line L2 in the circumferential direction may be configured to gradually increase toward the outer circumference. According to this structure, the impregnation slit 10*a* provided at the previous layer and the impregnation slit 10*a* provided at the next layer are more likely to face each other, so that the impregnation path IP may be smoothly provided.

In still another embodiment of the present disclosure, the distance between the impregnation slits 10*a* located on the same line may gradually increase from the core of the electrode assembly 1 toward the outer circumference. For example, referring to FIG. 2*d*, the distance between the impregnation slits 10*a* located on the first line L1 may be configured to gradually increase toward the outer circumference. Similarly, the distance between the impregnation slits 10*a* located on the second line L2 may be configured to gradually increase toward the outer circumference. According to this structure, the impregnation slit 10*a* provided at the previous layer and the impregnation slit 10*a* provided at the next layer are more likely to face each other, so that the impregnation path IP may be smoothly provided.

In still another embodiment of the present disclosure, the first non-coated portion 10 may further include at least one intermediate line Ln, which is an imaginary straight line located between the first line L1 and the second line L2, parallel to the first line L1 and the second line L2, and spaced apart from the first line L1 and the second line L2 by a predetermined distance. For example, referring to FIG. 2*c*, a third line L3 may be provided between the first line L1 and the second line L2. However, the present invention is not limited thereto, and a fourth line, a fifth line, and the like may be further provided. That is, the present disclosure is not limited to the number of lines. That is, the intermediate line Ln may be provided in plural. Here, the impregnation slit 10*a* may be provided on at least one of the plurality of intermediate lines Ln. An intermediate impregnation slit 10*a* may be provided on the intermediate line Ln. Preferably, the impregnation slits 10*a* may be alternately provided along the circumferential direction on the plurality of intermediate lines Ln. For example, referring to FIG. 2*c*, the impregnation slits 10*a* may be provided on the first line L1, the second line L2, the third line L3, the second line L2, and the first line L1 in order from the left. However, the order is not limited thereto, and as long as the impregnation slits 10*a* adjacent in the circumferential direction are not formed on the same line, it will be included in the scope of the present disclosure.

In still another embodiment of the present disclosure, the impregnation slits 10*a* provided on the first line L1 and the second line L2 may be arranged with rules independent of each other. For example, the impregnation slits 10*a* provided on the first line L1 may be arranged with a certain rule. Also, the impregnation slits 10*a* provided on the second line L2 may be arranged with a certain rule. However, the impregnation slits 10*a* provided on the first line L1 and the impregnation slits 10*a* provided on the second line L2 may in principle be independently arranged without affecting each other. However, as an exception, it is preferable that the impregnation slits 10*a* provided on the first line L1 and the impregnation slits 10*a* provided on the second line L2 do not overlap each other in the winding axis direction. If the impregnation slits 10*a* provided on the first line L1 and the impregnation slits 10*a* provided on the second line L2 overlap in the winding axis direction, the area of the cut surface formed by cutting the non-coated portion along the winding axis is excessively reduced, which leads to a decrease in the strength of the non-coated portion.

In still another embodiment of the present disclosure, it is preferable that the number of impregnation slits 10*a* provided on each imaginary line is approximately the same. In other words, the number of impregnation slits 10*a* provided on the first line L1, the number of impregnation slits 10*a* provided on the second line L2, and the number of impregnation slits 10*a* provided on at least one intermediate line Ln may be approximately the same. For example, when referring to FIG. 2*c*, if the total number of impregnation slits 10*a* provided in the first non-coated portion 10 is 30, the number of impregnation slits 10*a* provided on the first line L1, the number of impregnation slits 10*a* provided on the second line L2, and the number of impregnation slits 10*a* provided on the third line L3 are preferably approximately 10, respectively. This is because, if the impregnation slits 10*a* are exceptionally formed on only one line, the cross-sectional area of the cut surface formed by cutting the non-coated portion along the line is excessively reduced, which may lead to a decrease in the strength of the non-coated portion.

Referring to FIG. 3, the plurality of impregnation slits 10*a* may be disposed parallel to each other, and may have an inclined shape while forming a predetermined angle with a line extending along the circumferential direction.

According to this structure, as described above, compared with the case where the plurality of impregnation slits 10*a* having a shape extending in the circumferential direction and parallel to the circumferential direction are formed on the same line, strength weakening of the first non-coated portion 10 caused by the formation of the impregnation slit 10*a* may be minimized. In addition, according to this structure, it is possible to have a uniform electrolyte impregnation property in the entire area of the first non-coated portion 10 in the height direction (parallel to the Z-axis).

On the other hand, for the same purpose as minimizing the reduction of the area of the cross section at the position where the impregnation slit 10*a* is formed as described above, the impregnation slit 10*a* may be arranged to be spaced apart from the cutting line 10*b*, which will be described later, by a predetermined distance along an extension direction (parallel to the Z-axis) of the winding axis. For example, the distance between the cutting line 10*b* and the impregnation slit 10*a* is preferably between about 1 mm and about 5 mm, and more preferably between about 2 mm and about 3 mm. If the distance between the cutting line 10*b* and the impregnation slit 10*a* is smaller than about 1 mm, the distance between the cutting line 10*b* and the impregnation slit 10*a* becomes excessively narrow, thereby increasing the probability of fracture between the cutting line 10*b* and the impregnation slit 10*a*. Meanwhile, if the distance between the cutting line 10*b* and the impregnation slit 10*a* is larger than about 5 mm, the dead space, which is an unnecessary space, increases, thereby lowering the energy density. Therefore, when the distance between the cutting line 10*b* and the impregnation slit 10*a* is about 1 mm to about 5 mm, the possibility that the first non-coated portion 10 is fractured due to external forces such as shock and vibration that may be applied during the manufacture and use of the battery is further lowered, and simultaneously the energy density may be increased.

In another embodiment of the present disclosure, the first non-coated portion 10 may be located at an upper portion of the electrode assembly 1, and the second non-coated portion may be located below the electrode assembly 1. In this case, the impregnation slit 10*a* provided in the first non-coated portion 10 is positioned above the electrode assembly 1. Therefore, the electrolyte introduced from the upper part of the electrode assembly 1 may penetrate into the electrode assembly 1 through the impregnation slit 10*a* formed at the upper part of the electrode assembly 1, and then penetrate smoothly to the central region and lower region of the electrode assembly 1 by the influence of gravity. Optionally, the impregnation slit may also be provided in the second non-coated portion located below the electrode assembly 1. That is, as described above, in this specification, only the case in which the first electrode is provided with the impregnation slit 10*a* has been described for convenience of description, but the impregnation slit 10*a* may be provided only at the second electrode, or may be provided at both the first electrode and the second electrode.

Meanwhile, the first electrode may be a negative electrode. In this case, the second electrode becomes a positive electrode. However, the first electrode and the second electrode of the present disclosure are not limited to any one electrode, and they may be selected reversely.

Figure 4:
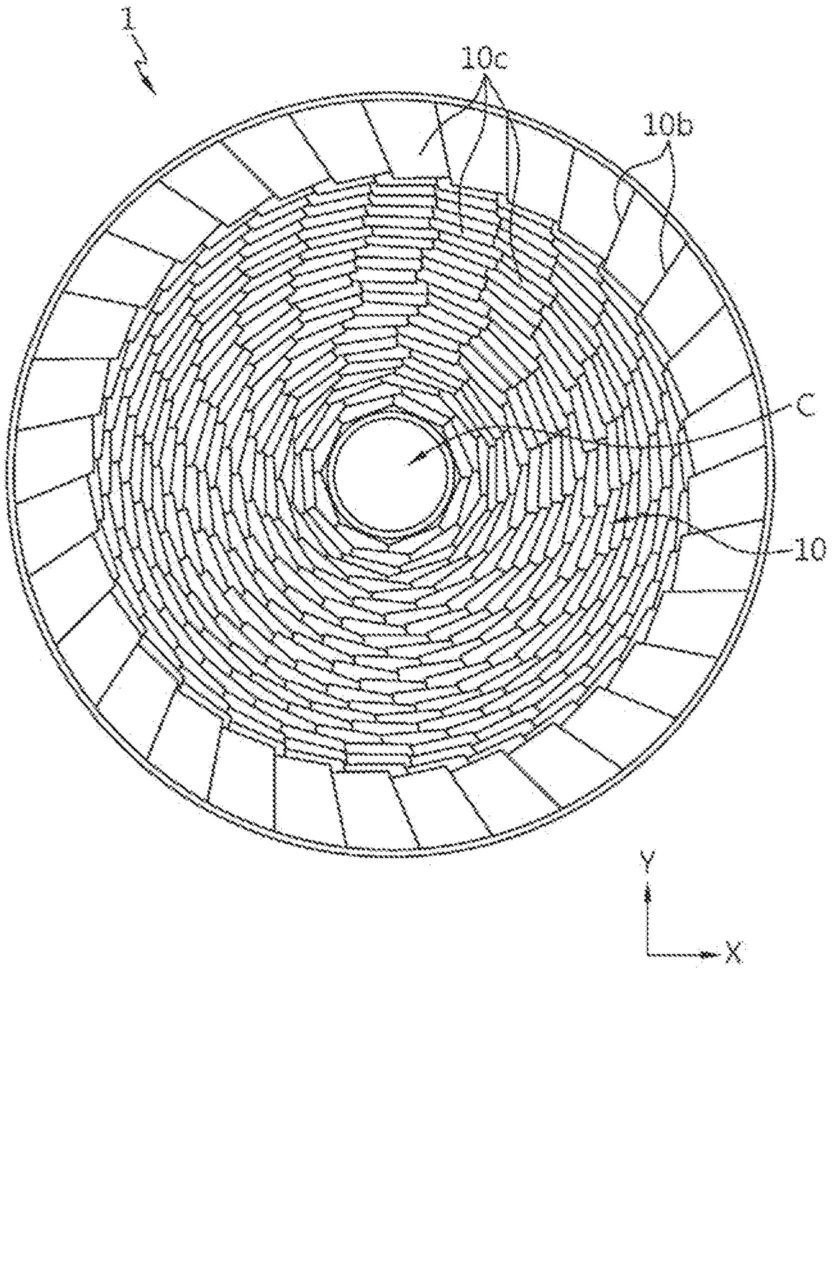
FIG. 4 is a plan view of the electrode assembly of FIG. 1.
Figure 5A:
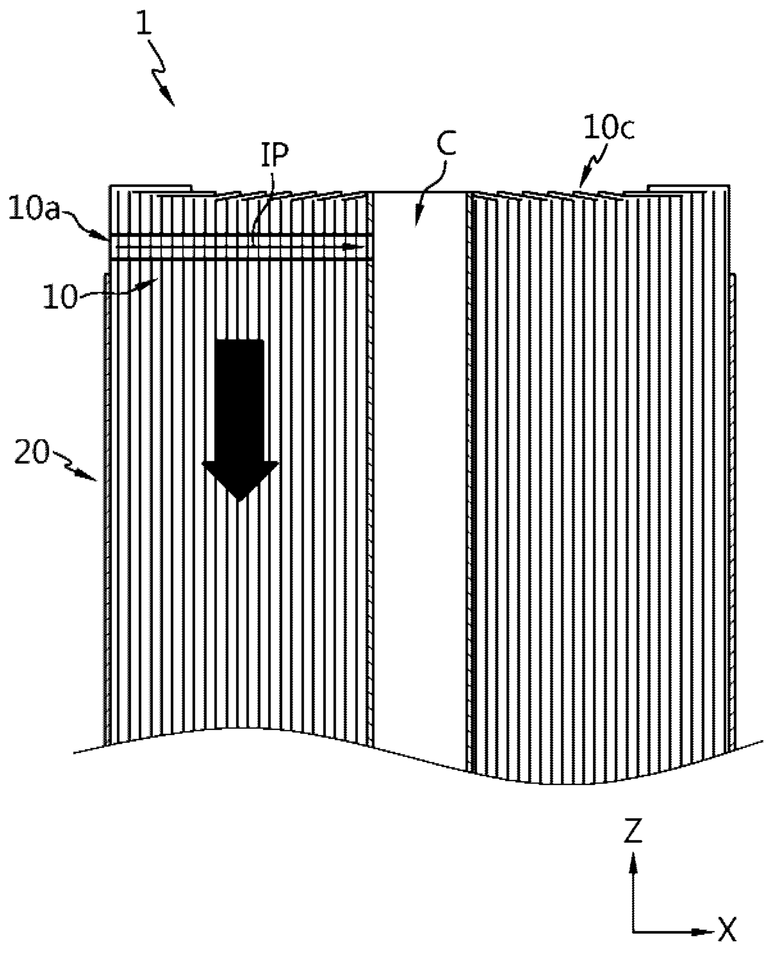
FIG. 5*a* is a front sectioned view of the electrode assembly of FIG. 1.

FIG. 4 is a plan view of the electrode assembly of FIG. 1, and FIG. 5*a* is a front sectioned view of the electrode assembly of FIG. 1.

Referring to FIGS. 4 and 5*a*, the first non-coated portions 10 may include a plurality of fragments 10*c* formed to be spaced apart from each other along the circumferential direction of the electrode assembly 1 and partitioned by the plurality of cutting lines 10*b* formed to a predetermined depth from an end of the first non-coated portion 10. That is, the fragment 10*c* is provided at one end of the first non-coated portion 10.

The plurality of fragments 10*c* may be bent in a radial direction of the electrode assembly 1 to cover at least a part of one surface of the electrode assembly 1 perpendicular to the winding axis. Here, the radial direction means a direction toward the core or the outer circumference. For example, referring to FIGS. 4 and 5*a*, the plurality of fragments 10*c* may be bent toward the core and entirely cover one surface of the electrode assembly 1 perpendicular to the winding axis.

In this way, since the fragment 10*c* provided at one end of the first non-coated portion 10 is bent to cover one surface of the electrode assembly 1 perpendicular to the winding axis, a contact area between a current collector (not shown) to be coupled on one surface of the electrode assembly 1 and the first non-coated portion 10 may be secured widely. Accordingly, the internal resistance of the battery may be reduced. In addition, the coupling strength between the electrode assembly 1 and the current collector may be improved.

On the other hand, after the electrode assembly 1 is received in the battery housing, electrolyte may be injected through a top opening of the battery housing. At this time, since the plurality of fragments 10*c* entirely cover one surface of the electrode assembly 1 perpendicular to the winding axis, the electrolyte may not be smoothly impregnated through the top of the electrode assembly 1. In particular, in the case of a battery of a medium or large size, the electrolyte may not be impregnated to the center of the electrode assembly 1.

Therefore, in the present disclosure, among the plurality of impregnation slits 10*a*, the impregnation slits 10*a* adjacent to each other along the radial direction of the electrode assembly 1 may at least partially overlap each other to provide an impregnation path IP through which the electrolyte can pass along the radial direction. At this time, the impregnation path IP may be provided from the outer circumferential surface of the electrode assembly 1 to a predetermined depth along the radial direction.

For example, referring to FIG. 5*a*, the plurality of fragments 10*c* provided at one end of the first non-coated portion 10 are bent in a direction toward the core to entirely cover one surface of the electrode assembly 1 perpendicular to the winding axis. At this time, among the plurality of impregnation slits 10*a*, the impregnation slits 10*a* adjacent to each other along the radial direction of the electrode assembly 1 at least partially overlap each other, thereby forming an impregnation path IP through which the electrolyte can pass along the radial direction. In FIG. 5*a*, the impregnation path IP is provided along the radial direction from the outer circumferential surface of the electrode assembly 1 to the winding center C. Therefore, the electrolyte may move to the center of the electrode assembly 1 through the impregnation paths IP formed through the electrode assembly 1. The electrolyte introduced into the impregnation paths IP may flow down due to the force of gravity. Therefore, in the electrode assembly 1 of the present disclosure, the entire area in the height direction (direction parallel to the Z axis) and the entire area in the radial direction may be uniformly impregnated by the electrolyte.

Figure 5B:
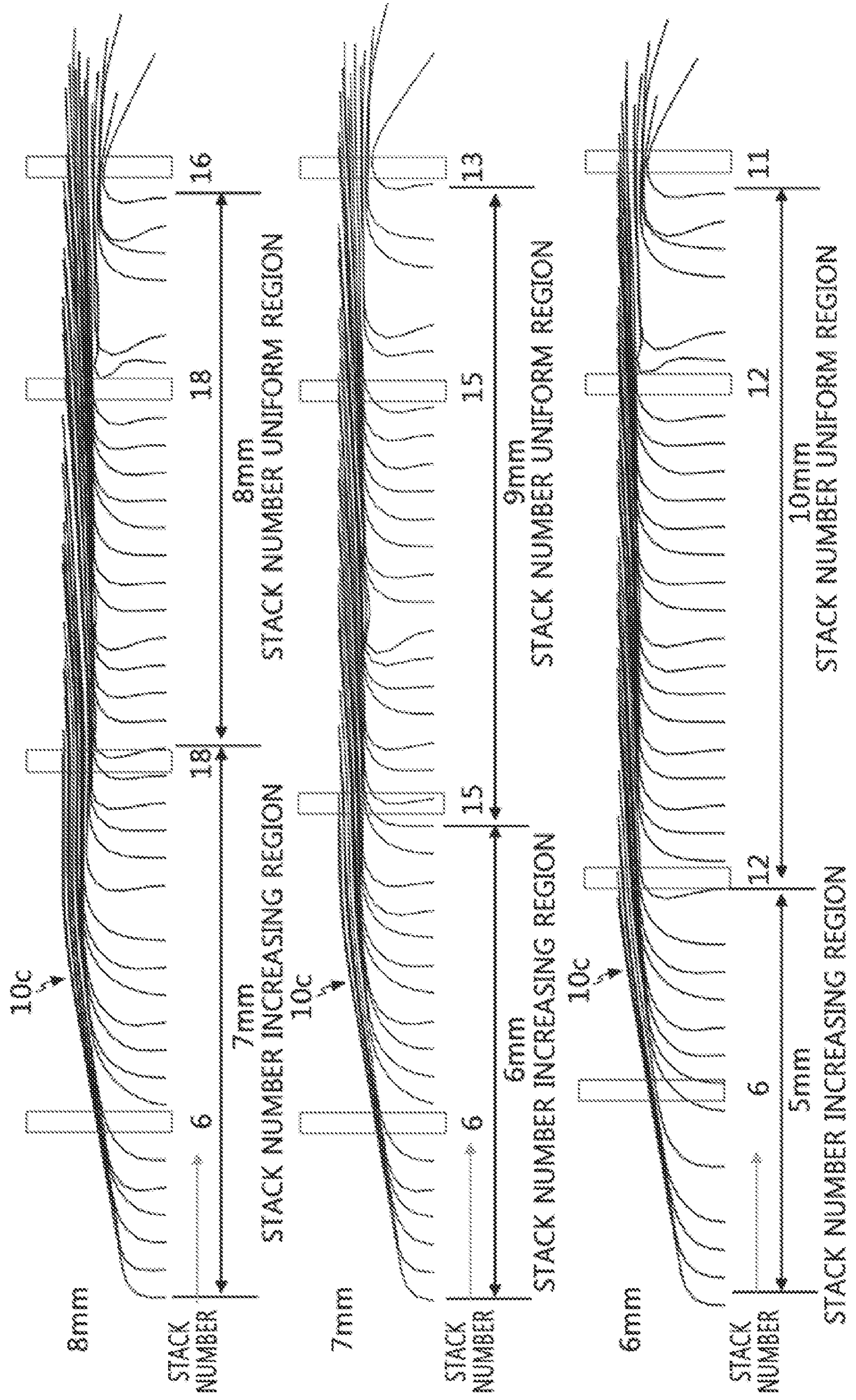
FIG. 5*b* is a partially enlarged view showing a fragment of FIG. 5*a*.

FIG. 5*b* is a partially enlarged view showing a fragment of FIG. 5*a*.

Referring to FIG. 5*b*, the plurality of fragments 10*c* may be overlapped in multiple layers along the radial direction of the electrode assembly 1 to form a bent surface. The bent surface may include a stack number increasing region in which the overlapping layer number of the fragments 10*c* sequentially increases from the outer circumference toward the core of the electrode assembly 1 to a maximum value, and a stack number uniform region from a radial point at which the overlapping layer number becomes the maximum value to a radial point at which an innermost fragment exists.

In this case, in a state where the current collector (not shown) is seated on the bent surface of the first non-coated portion 10, welding may be performed on a predetermined area. That is, the current collector may be coupled to a region in which a plurality of fragments 10*c* overlap in multiple layers. In particular, the current collector may be coupled to the bent surface to overlap the stack number uniform region. For example, the current collector and the first non-coated portion 10 may be welded in a region where the overlapping layer number of the first non-coated portion 10 is 10 or more in the bent surface of the first non-coated portion 10. The radial direction ratio of the region where the overlapping layer number is 10 or more may be designed to be 25% or more based on the radius of the electrode assembly excluding the core by adjusting the length of the first non-coated portion 10.

FIG. 5*b* is a partial cross-sectional view showing an electrode assembly having a radius of 22 mm and a radius of core of 4 mm included in a battery having a form factor of 4680, in which the first non-coated portion 10 of the first conductive substrate divided into a plurality of fragments is bent from the outer circumference toward the core to be overlapped in 10 layers or more to form a bent surface. In FIG. 5*b*, the electrode assembly region free from fragments and the core region are not separately shown. The height of the fragments starts at 3 mm and increases by 1 mm whenever the radius of the electrode assembly increases by 1 mm. In addition, the height of the fragment is maintained to be substantially constant after reaching the length of 6 mm, 7 mm or 8 mm shown in the drawing.

Referring to FIG. 5*b*, it may be found that the overlapping layer number of the first non-coated portion 10 gradually increases from the outer circumference toward the core, and the maximum value of the overlapping layer number increases as the length of the first non-coated portion 10 increases.

For example, when the length of the first non-coated portion 10 is 8 mm, the overlapping layer number of the first non-coated portion 10 divided into a plurality of fragments increases to 18 from the outer circumference of the electrode assembly to the 7 mm region, and the overlapping layer number of the first non-coated portion 10 is maintained constant at the maximum value of 18 the 8 mm region toward the core and then decreases by 1 or 2 in the radius region adjacent to the core. The height of the fragment increases stepwise from 3 mm to 8 mm in the radius region of 7 mm to 12 mm. In the present disclosure, the stack number uniform region is defined as a radius region from a radial point where the overlapping layer number reaches the maximum value to a point where the innermost fragment is located, as shown in FIG. 5*b*. Accordingly, the ratio of the stack number uniform region in which the fragments 10*c* of the first non-coated portion 10 are overlapped in 10 or more layers is 44.4% (8/18) of the radius of the electrode assembly excluding the core (4 mm).

As another example, when the length of the first non-coated portion 10 is 7 mm, the overlapping layer number of the first non-coated portion 10 divided into a plurality of fragments increases to 15 from the outer circumference of the electrode assembly to the 6 mm region, and the overlapping layer number of the first non-coated portion 10 is maintained constant at the maximum value of 15 in the 9 mm region toward the core and then decreases by 1 to 2 in the radius section adjacent to the core. The height of the fragment increases stepwise from 3 mm to 7 mm in the radius region of 7 mm to 11 mm. Therefore, the ratio of the stack number uniform region in which the fragments 10*c* of the first non-coated portion 10 are overlapped in 10 or more layers is 50% (9/18) of the radius of the electrode assembly excluding the core (4 mm).

As another example, when the length of the first non-coated portion 10 is 6 mm, the overlapping layer number of the first non-coated portion 10 divided into a plurality of fragments increases to 12 from the outer circumference of the electrode assembly to the 5 mm region, and the overlapping layer number of the first non-coated portion 10 is maintained constant at the maximum value of 12 in the 10 mm region toward the core and then decreases by 1 to 2 in the radius region adjacent to the core. The height of the fragment increases from 3 mm to 6 mm in the radius region of 7 mm to 10 mm. Therefore, the ratio of the stack number uniform region in which fragments 10*c* of the first non-coated portion 10 are overlapped in 10 or more layers is 55.6% (10/18) of the radius of the electrode assembly excluding the core (4 mm).

In the present disclosure, the stack number uniform region may be increased or decreased by the radius of the core, the minimum and maximum values of the fragment height in the fragment height variable region, and the height increase width of the fragments in the radial direction of the electrode assembly. Therefore, it is very obvious to those skilled in the art to design a corresponding ratio as 25% or more by adjusting factors affecting the ratio of the stack number uniform region. In one example, when the minimum and maximum values of the fragment height are increased together in the fragment height variable region, the overlapping layer number increases while the ratio of the stack number uniform region may be reduced to a level of 25%.

The stack number uniform region is a region where the current collector may be welded. Therefore, if the ratio of the stack number uniform region is adjusted to 25% or more, the welding strength of the current collector may be secured in a desirable range, and it is advantageous in terms of resistance of the welding interface.

In another embodiment of the present disclosure, when the first non-coated portion 10 has such a bent shape, the space occupied by the first non-coated portion 10 may be reduced, thereby improving energy density. In addition, as the coupling area between the first non-coated portion 10 and the current collector 30 is increased, it is possible to bring about an effect of improving the coupling strength and reducing the resistance.

Figure 6:
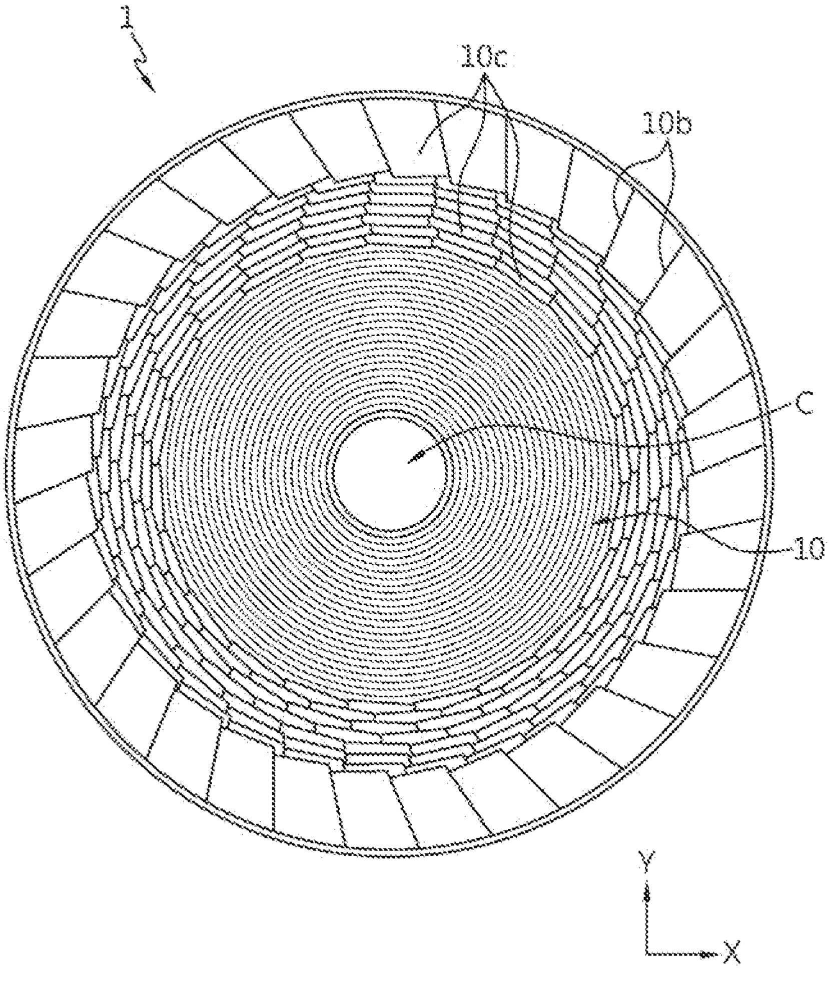
FIG. 6 is a plan view of an electrode assembly having a different shape from the electrode assembly shown in FIG. 4.
Figure 7:
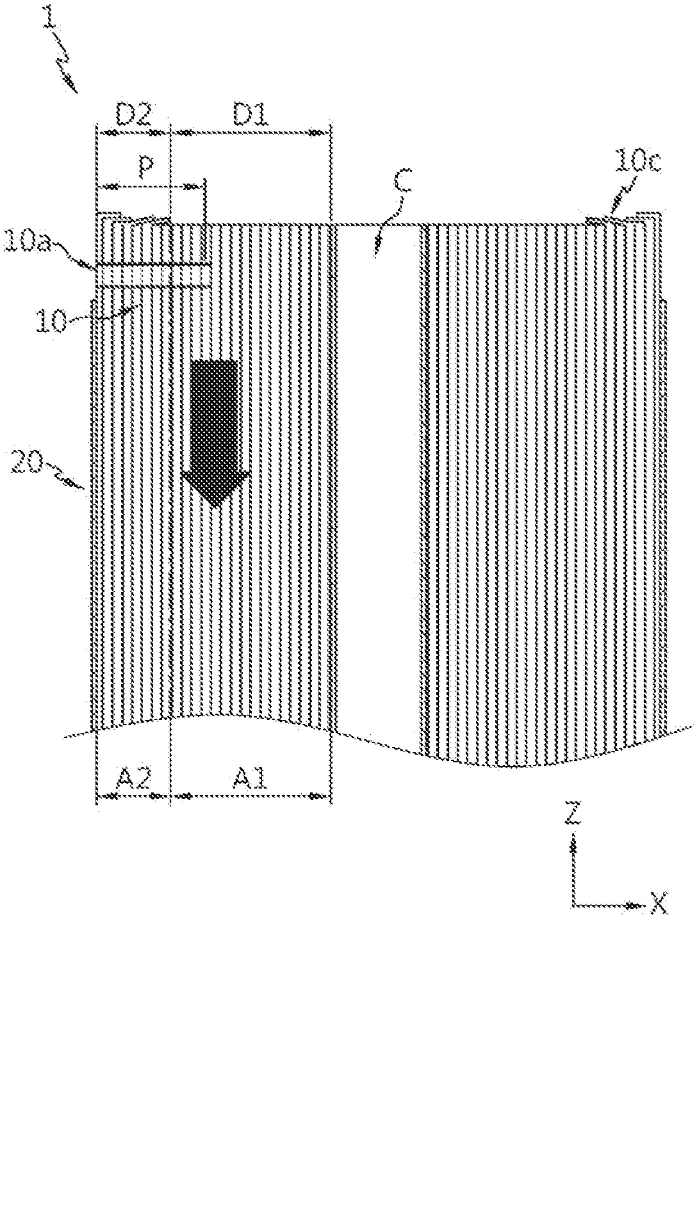
FIG. 7 is a front sectioned view of the electrode assembly of FIG. 6.

FIG. 6 is a plan view of an electrode assembly having a different shape from the electrode assembly shown in FIG. 4, and FIG. 7 is a front sectioned view of the electrode assembly of FIG. 6.

Referring to FIGS. 6 and 7, the plurality of fragments 10*c* may be bent in a radial direction of the electrode assembly 1. In particular, the plurality of fragments 10*c* may be bent in a direction toward the core of the electrode assembly 1 to cover only a part of one surface of the electrode assembly 1 perpendicular to the winding axis.

In this case, the length of the first non-coated portion 10 in an area adjacent to the winding center C of the electrode assembly 1 and the length of the first non-coated portion 10 in an area adjacent to the outer circumferential surface of the electrode assembly 1 may be different from each other. For example, the length of the first non-coated portion 10 in the area adjacent to the winding center C of the electrode assembly 1 may be shorter than the length of the first non-coated portion 10 in the area adjacent to the outer circumferential surface of the electrode assembly 1. In particular, the cutting line 10*b* and the fragment 10*c* may not be provided to the first non-coated portion 10 in the area adjacent to the winding center C of the electrode assembly 1. That is, the plurality of cutting lines 10*b* and the plurality of fragments 10*c* may be provided only to the first non-coated portion 10 in the area adjacent to the outer circumferential surface of the electrode assembly 1.

Therefore, according to the above embodiment, in the area adjacent to the winding center C of the electrode assembly 1, the first non-coated portion 10 may have a structure that is open upward without being bent. Hereinafter, the area whose upper side is not covered by the fragment 10*c* will be referred to as a first area A1. At this time, the radial length of the first area A1 will be referred to as D1.

On the other hand, the plurality of fragments 10*c* provided to the first non-coated portion 10 in the area adjacent to the outer circumferential surface of the electrode assembly 1 may be bent in a direction toward the winding axis to cover only a part of one surface of the electrode assembly 1 perpendicular to the winding axis. Hereinafter, the area whose upper side is covered by the fragment 10*c* will be referred to as a second area A2. At this time, the radial length of the second area A2 will be referred to as D2.

According to this structure, since the first area A1 is not covered by the fragment 10*c* and has a structure that is open upward, the electrolyte introduced through the top opening of the battery housing may smoothly flow into the first area A1. Therefore, the electrolyte impregnation property may be further improved.

However, in this case, the impregnation rate of the second area A2 may be slightly lower than the impregnation rate of the first area A1. Therefore, it is necessary to improve the impregnation rate of the second area A2. Accordingly, in the present disclosure, the depth P of the impregnation path IP may be greater than or equal to the radial length of the area covered by the fragment 10*c*, in one surface of the electrode assembly 1 perpendicular to the winding axis. That is, referring to FIG. 7, the depth P of the impregnation path IP may be formed to be greater than or equal to the radial length D2 of the second area A2.

According to this structure, the electrolyte may move to at least a boundary point between the second area A2 and the first area A1 through the impregnation path IP. Alternatively, the electrolyte may move beyond the second area A2 to the first area A1. After that, the electrolyte may flow down due to the force of gravity. Therefore, the electrode assembly 1 of the present disclosure may be uniformly impregnated by the electrolyte even to the inside thereof.

Meanwhile, as described above, in this specification, only the case in which the cutting line 10*b* and the fragment 10*c* are provided to the first electrode has been described for convenience of description, but the cutting line 10*b* and the fragment 10*c* may also be provided only to the second electrode or to both the first electrode and the second electrode.

<Test of Impregnation Property and Durability>

The electrolyte impregnation property of the electrode assembly of the present disclosure was evaluated. In addition, a drop test and a vibration test were performed to evaluate the strength of the non-coated portion.

1) Evaluation of the Electrolyte Impregnation Property

An electrode assembly in which impregnation slits are formed for electrolyte impregnation is fabricated. Then, after the electrode assembly is received through the top opening of the battery housing, electrolyte is injected into the battery housing. After the electrolyte is injected, it is aged for 24 hours, and then the level of impregnation of the electrolyte is analyzed.

O (pass): Non-impregnation area does not exist

X (fail): Non-impregnation area exists

2) Evaluation of Strength of the Non-Coated Portion—Drop Test

After the electrode assembly and the current collector are welded, this is inserted into the battery housing to manufacture a battery. After that, the battery charged up to 4.2 V freely falls from a height of 1.0 m onto a wooden floor, and then it is checked whether short circuit and/or ignition occurs in the battery.

O (pass): Short circuit and/or ignition does not occur in the battery

X (fail): Short circuit and/or ignition occurs in the battery

3) Evaluation of Strength of the Non-Coated Portion—Vibration Test

After the electrode assembly and the current collector are welded, this is inserted into the battery housing to manufacture a battery. After that, the battery charged up to 4.2 V is vibrated. The vibration method is to change vibration the frequency every 15 minutes as 7 Hz⇆200 Hz, which is repeated 12 times in each of X-axis, Y-axis and Z-axis directions. After the vibration test is completed, it is checked whether short circuit and/or ignition occurs in the battery.

O (pass): Short circuit and/or ignition does not occur in the battery

X (fail): Short circuit and/or ignition occurs in the battery

Example 1

An electrode assembly was manufactured such that among the plurality of impregnation slits, impregnation slits adjacent to each other along the circumferential direction were not formed on the same line but were provided at staggered positions (zigzag type).

Comparative Example 1

Except that the impregnation slit was not provided at all, an electrode assembly was manufactured with the other conditions being the same as in Example 1.

Comparative Example 2

Except that a plurality of impregnation slits were formed on the same line along the circumferential direction, an electrode assembly was manufactured with the other conditions being the same as in Example 1.

For each electrode assembly obtained as described above, the results of evaluating the electrolyte impregnation property and the strength of the non-coated portion are summarized in Table 1.

TABLE 1

| | Formation of impregnation slits | Electrolyte impregnation property | Drop test | Vibration test |
|---|---|---|---|---|
| Comparative example 1 | no | X | ○ | ○ |
| Comparative example 2 | linear | ○ | X | X |
| Example 1 | zigzag | ○ | ○ | ○ |

From this table, the following points are evident.

In the example 1, there was no non-impregnation area in the electrode assembly since the electrolyte impregnation property was excellent. In addition, the electrode assembly of Example 1 passed the drop test and the vibration test, so it might be confirmed that the non-coated portion had excellent strength.

In the comparative example 1, since the impregnation slit was not provided, the electrolyte impregnation property was poor, and thus a non-impregnation area existed in the electrode assembly.

In the comparative example 2, the electrolyte impregnation property was satisfied because the impregnation slits were provided on the same line along the circumferential direction of the electrode assembly, but the strength of the non-coated portion was not secured. Specifically, the electrode assembly of the comparative example 2 was damaged in a part of the non-coated portion as a result of the drop test and the vibration test. That is, in the electrode assembly of the comparative example 2, the strength of the non-coated portion was low, and thus the quality and safety of the battery could not be secured.

Meanwhile, the battery B including the electrode assembly 1 of the present disclosure has a structure in which resistance is minimized through expansion of contact areas between components, multiplexing of current paths, minimization of current path lengths, and the like. After a product is completed, the AC resistance of the battery B, measured through a resistance meter between the positive electrode and the negative electrode may be 0.5 milliohm to 4 milliohm, preferably 1 milliohm to 4 milliohms, which is suitable for fast charging.

In the present disclosure, the battery may be a battery in which, for example, a ratio of form factor (a value obtained by dividing the diameter of the battery by its height, i.e., defined as a ratio of diameter (D to height H) is larger than approximately 0.4. Here, the form factor refers to a value indicating the diameter and height of the battery.

Preferably, the cylindrical battery may be 40 mm to 50 mm in diameter, and 60 mm to 130 mm in height. The battery according to an embodiment may be, for example, 46110 battery, 4875 battery, 48110 battery, 4880 battery, and 4680 battery. In the value indicating the form factor, the former two numbers indicate the diameter of the battery, and next two numbers indicate the height of the battery.

Recently, as batteries are applied to electric vehicles, compared to the existing 1865, 2170 batteries, the form factor of batteries increases. The increased form factor leads to increased energy density, enhanced safety against thermal runaway and improved cooling efficiency.

The energy density of batteries may be further increased by minimizing the unnecessary space inside the battery housing with the increasing form factor. The battery according to the present disclosure has an optimal structure for increasing the capacity of the battery and lowering the resistance while improving the electrolyte impregnation property of the electrode current collector.

The battery according to an embodiment of the present disclosure may be a battery having an approximately cylindrical shape with the diameter of approximately 46 mm, the height of approximately 110 mm and the ratio of form factor of approximately 0.418.

The battery according to another embodiment may be a battery having an approximately cylindrical shape with the diameter of approximately 48 mm, the height of approximately 75 mm and the ratio of form factor of approximately 0.640.

The battery according to another embodiment may be a battery having an approximately cylindrical shape with the diameter of approximately 48 mm, the height of approximately 110 mm and the ratio of form factor of approximately 0.436.

The battery according to another embodiment may be a battery having an approximately cylindrical shape with the diameter of approximately 48 mm, the height of approximately 80 mm, and the ratio of form factor of approximately 0.600.

The battery according to another embodiment may be a battery having an approximately cylindrical shape with the diameter of approximately 46 mm, the height of approximately 80 mm, and the ratio of form factor of approximately 0.575.

Conventionally, batteries having the ratio of form factor of approximately 0.4 or less have been used. That is, for example, 1865 battery and 2170 battery have been used. In the case of 1865 battery, the diameter is approximately 18 mm, the height is approximately 65 mm, and the ratio of form factor is approximately 0.277. In the case of 2170 battery, the diameter is approximately 21 mm, the height is approximately 70 mm, and the ratio of form factor is approximately 0.300.

Figure 8:
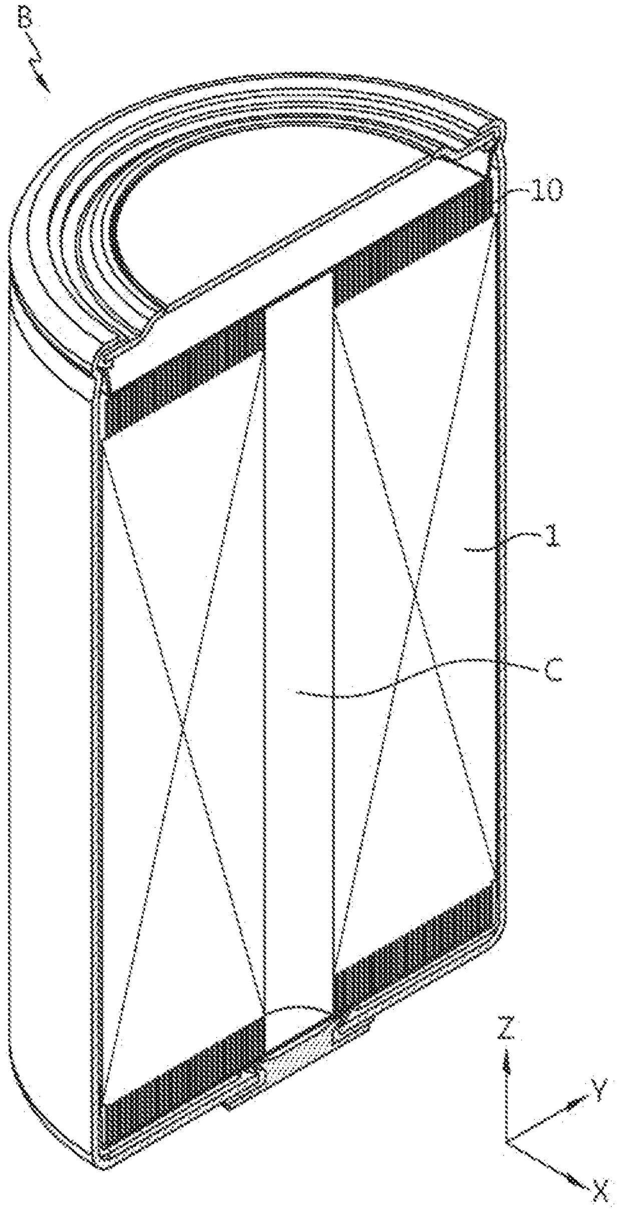
FIG. 8 is a diagram for explaining a battery including the electrode assembly according to an embodiment of the present disclosure.
Figure 9:
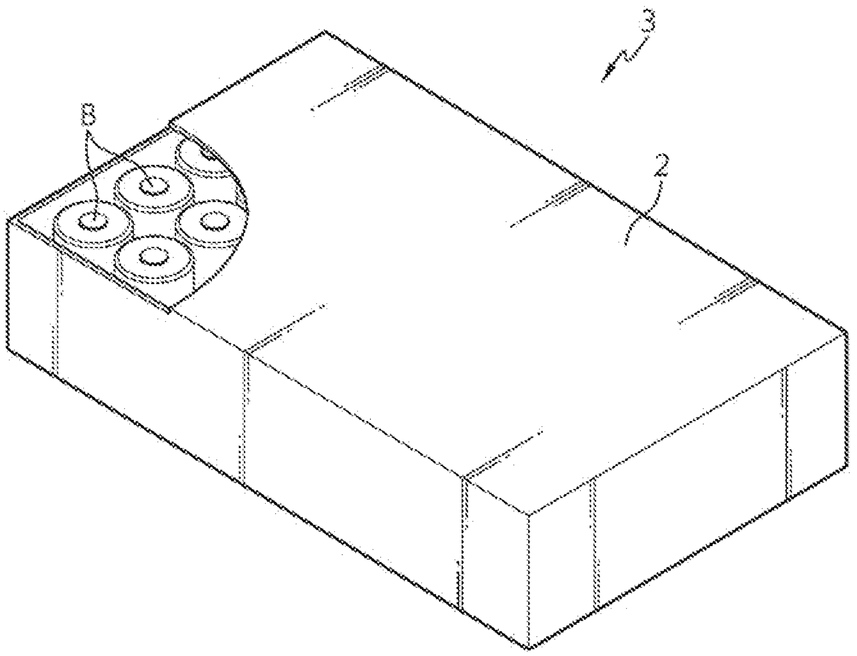
FIG. 9 is a diagram for explaining a battery pack including the battery according to an embodiment of the present disclosure.

The electrode assembly 1 according to the embodiment of the present disclosure may be included in a battery B. Referring to FIG. 8, the wound electrode assembly 1 is accommodated in a battery housing of the battery B. The battery B according to the embodiment of the present disclosure may be included in a battery pack 3, and the battery pack 3 may be mounted in a vehicle V. Referring to FIG. 9, the battery pack 3 according to an embodiment of the present disclosure includes an assembly in which a plurality of batteries B are electrically connected and a pack housing 2 for accommodating the assembly. In the drawings, parts such as a bus bar, a cooling unit, and a power terminal for electrical connection are omitted for convenience of illustration.

Figure 10:
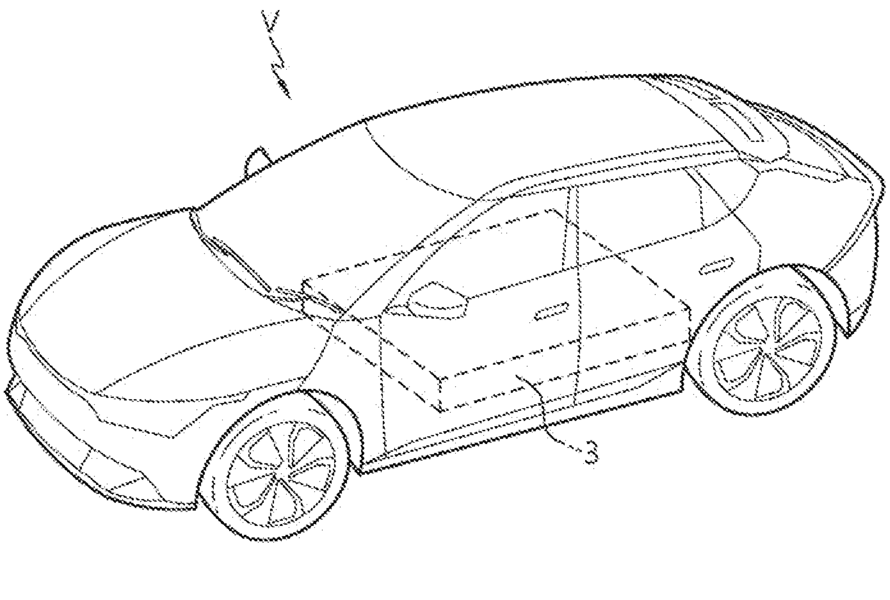
FIG. 10 is a diagram for explaining a vehicle that includes the battery pack of FIG. 9.

Referring to FIG. 10, a vehicle V according to an embodiment of the present disclosure may be, for example, an electric vehicle, a hybrid electric vehicle, or a plug-in hybrid vehicle, and may include the battery pack 3 according to an embodiment of the present disclosure. The vehicle V operates by receiving power from the battery pack 3 according to an embodiment of the present disclosure.

On the other hand, although terms indicating directions such as up and down are used in this specification, these terms are only for convenience of explanation, and it is obvious to those skilled in the art of the present disclosure that they may vary depending on the location of a target object or the location of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

EXPLANATION OF SIGNS

1 electrode assembly
10 first non-coated portion
10*a* impregnation slit
10*b* cutting line
10*c* fragment
20 coated portion
IP impregnation path
P depth of the impregnation path
C winding center
A1 first area
A2 second area
D1 radial length of the first area
D2 radial length of the second area
B battery
2 pack housing
3 battery pack
V vehicle

What is claimed is:

1. An electrode assembly comprising a first electrode, a second electrode, and a separator interposed between the first electrode and the second electrode, the first electrode, the second electrode, and the separator being wound in a winding direction about a winding axis to define a core and an outer circumference of the electrode assembly,
- wherein the first electrode includes an active material portion coated with an active material layer and a first non-coated portion not coated with the active material layer along the winding direction,
- wherein the first non-coated portion includes a plurality of impregnation slits extending along a circumferential direction of the electrode assembly such that longitudinal extension lines of the impregnation slits extend in the circumferential direction, and
- wherein the longitudinal extension lines of impregnation slits adjacent to each other along the circumferential direction do not overlap each other.

2. The electrode assembly according to claim 1, wherein each impregnation slit has a shape extending in a direction parallel to the circumferential direction.

3. The electrode assembly according to claim 2, wherein a length of each impregnation slit in the circumferential direction is longer than a length of each impregnation slit in a direction of the winding axis.

4. The electrode assembly according to claim 2, wherein, among the plurality of impregnation slits, the impregnation slits adjacent to each other along the circumferential direction are at different heights in a direction of the winding axis without being formed on a same line.

5. The electrode assembly according to claim 2, wherein, among the plurality of impregnation slits, the impregnation slits adjacent to each other along the circumferential direction are spaced apart from each other by a predetermined distance along a direction parallel to the winding axis of the electrode assembly.

6. The electrode assembly according to claim 1, wherein, based on any one impregnation slit, longitudinal extension lines of impregnation slits located at the left and the right of the any one impregnation slit overlap each other.

7. The electrode assembly according to claim 1, wherein a distance between the impregnation slits adjacent to each other along the circumferential direction is constant.

8. The electrode assembly according to claim 1, wherein a distance between the impregnation slits adjacent to each other along the circumferential direction gradually increases from the core toward the outer circumference of the electrode assembly.

9. The electrode assembly according to claim 1, wherein a length of each impregnation slit in the circumferential direction is constant.

10. An electrode assembly comprising a first electrode, a second electrode, and a separator interposed between the first electrode and the second electrode, the first electrode, the second electrode, and the separator being wound in a winding direction about a winding axis to define a core and an outer circumference of the electrode assembly, wherein the first electrode includes an active material portion coated with an active material layer and a first non-coated portion not coated with the active material layer along the winding direction, wherein the first non-coated portion includes a plurality of impregnation slits extending along a circumferential direction of the electrode assembly, wherein longitudinal extension lines of impregnation slits adjacent to each other along the circumferential direction do not overlap each other, and wherein lengths of the impregnation slits in the circumferential direction gradually increases from the core toward the outer circumference of the electrode assembly.

11. An electrode assembly comprising a first electrode, a second electrode, and a separator interposed between the first electrode and the second electrode, the first electrode, the second electrode, and the separator being wound in a winding direction about a winding axis to define a core and an outer circumference of the electrode assembly, wherein the first electrode includes an active material portion coated with an active material layer and a first non-coated portion not coated with the active material layer along the winding direction, wherein the first non-coated portion includes a plurality of impregnation slits extending along a circumferential direction of the electrode assembly, wherein longitudinal extension lines of impregnation slits adjacent to each other along the circumferential direction do not overlap each other, and wherein the plurality of impregnation slits are inclined at a predetermined angle with respect to a line extending along the circumferential direction.

12. The electrode assembly according to claim 11, wherein the plurality of impregnation slits are parallel to each other.

13. The electrode assembly according to claim 1, wherein, among the plurality of impregnation slits, impregnation slits adjacent to each other along a radial direction of the electrode assembly at least partially overlap each other to provide an impregnation path to allow electrolyte to pass through along the radial direction.

14. The electrode assembly according to claim 13, wherein the impregnation path extends from the outer circumference of the electrode assembly to a predetermined depth along the radial direction.

15. An electrode assembly comprising a first electrode, a second electrode, and a separator interposed between the first electrode and the second electrode, the first electrode, the second electrode, and the separator being wound in a winding direction about a winding axis to define a core and an outer circumference of the electrode assembly, wherein the first electrode includes an active material portion coated with an active material layer and a first non-coated portion not coated with the active material layer along the winding direction, wherein the first non-coated portion includes a plurality of impregnation slits extending along a circumferential direction of the electrode assembly, wherein longitudinal extension lines of impregnation slits adjacent to each other along the circumferential direction do not overlap each other, and wherein the first non-coated portion has a plurality of fragments spaced apart from each other along the circumferential direction of the electrode assembly and partitioned by a plurality of cutting lines having a predetermined depth from an end of the non-coated portion.

16. The electrode assembly according to claim 15, wherein the plurality of fragments overlap are bent to overlap each other in multiple layers along a radial direction of the electrode assembly to define a bent surface, and wherein the bent surface includes a stack number increasing region in which an overlapping layer number of the fragments sequentially increases to a maximum value from the outer circumference toward the core, and a stack number uniform region from a radial point at which the overlapping layer number becomes the maximum value to a radial point at which an innermost fragment exists.

17. The electrode assembly according to claim 15, wherein the plurality of fragments are bent in the radial direction of the electrode assembly to cover at least a part of one surface of the electrode assembly perpendicular to the winding axis.

18. The electrode assembly according to claim 15, wherein the plurality of fragments are bent in the radial direction of the electrode assembly to entirely cover one surface of the electrode assembly perpendicular to the winding axis.

19. The electrode assembly according to claim 16, wherein, among the plurality of impregnation slits, impregnation slits adjacent to each other along the radial direction of the electrode assembly at least partially overlap each other to provide an impregnation path to allow electrolyte to pass through along the radial direction.

20. The electrode assembly according to claim 19, wherein the impregnation path is provided to a predetermined depth along the radial direction from the outer circumference of the electrode assembly.

21. The electrode assembly according to claim 20, wherein the depth of the impregnation path is greater than or equal to a radial length of an area covered by the plurality of fragments in one surface of the electrode assembly perpendicular to the winding axis.

22. The electrode assembly according to claim 15, wherein the non-coated portion includes:

a first line that is an imaginary line spaced apart from the active material portion by a first distance and parallel to a boundary line between the active material portion and the non-coated portion; and a second line that is an imaginary line spaced apart from an end of the cutting line by a second distance and parallel to the boundary line between the active material portion and the non-coated portion, wherein each impregnation slit is provided on at least one of the first line and the second line.

23. The electrode assembly according to claim 22, wherein the plurality of impregnation slits are alternately provided on the first line and the second line along the circumferential direction of the electrode assembly.

24. The electrode assembly according to claim 22, wherein impregnation slits located on different lines of the first line and second line do not overlap each other in a direction of the winding axis.

25. The electrode assembly according to claim 22, wherein lengths of the impregnation slits in the circumferential direction located on a same line of the first line and the second line gradually increase from the core toward the outer circumference of the electrode assembly.

26. The electrode assembly according to claim 22, wherein a distance between the impregnation slits located on a same line of the first line and the second line gradually increases from the core toward the outer circumference of the electrode assembly.

27. The electrode assembly according to claim 25, wherein the non-coated portion further includes at least one intermediate line that is an imaginary line located between the first line and the second line, parallel to the first line and the second line, and spaced apart from the first line and the second line by a predetermined length, and wherein the non-coated portion further includes a plurality of intermediate impregnation slits on the intermediate line.

28. The electrode assembly according to claim 27, wherein the at least one intermediate line includes a plurality of intermediate lines, and wherein the intermediate impregnation slits are alternately provided on the plurality of intermediate lines along the circumferential direction.

29. The electrode assembly according to claim 27, wherein numbers of impregnation slits provided on the first line, the second line and the at least one intermediate line are identical to each other.

30. The electrode assembly according to claim 15, wherein the cutting line and the plurality of impregnation slits are spaced apart from each other by a predetermined distance.

31. The electrode assembly according to claim 30, wherein the predetermined distance between the cutting line and the plurality of impregnation slits is 1 mm to 5 mm.

32. The electrode assembly according to claim 1, wherein the first non-coated portion is located at an upper portion of the electrode assembly.

33. The electrode assembly according to claim 32, wherein the first electrode is a negative electrode.

34. The electrode assembly according to claim 1, wherein the second electrode includes an active material portion coated with an active material layer and a second non-coated portion not coated with the active material layer along the winding direction, wherein the second non-coated portion includes a plurality of impregnation slits extending along the circumferential direction of the electrode assembly, and wherein longitudinal extension lines of impregnation slits of the second electrode adjacent to each other along the circumferential direction do not overlap each other.

35. A battery, comprising the electrode assembly according to claim 1.

36. A battery pack, comprising at least one battery according to claim 35.

37. A vehicle, comprising the battery pack according to claim 36.

* * * * *